United States Patent
Babaie et al.

(10) Patent No.: US 12,473,213 B2
(45) Date of Patent: Nov. 18, 2025

(54) FLUID DISINFECTION APPARATUS AND METHODS

(71) Applicants: WATERSPRINT AB, Lund (SE); THE UNIVERSITY OF BRITISH COLUMBIA, Vancouver (CA)

(72) Inventors: Ashkan Babaie, Vancouver (CA); Babak Adeli-Koudehi, Vancouver (CA); Fariborz Taghipour, Burnaby (CA)

(73) Assignees: WATERSPRINT AB, Lund (SE); THE UNIVERSITY OF BRITISH COLUMBIA, Vancouver (CA)

( * ) Notice: Subject to any disclaimer, the term of this patent is extended or adjusted under 35 U.S.C. 154(b) by 0 days.

(21) Appl. No.: 17/872,672

(22) Filed: Jul. 25, 2022

(65) Prior Publication Data

US 2023/0088023 A1     Mar. 23, 2023

Related U.S. Application Data

(63) Continuation of application No. 16/616,204, filed as application No. PCT/CA2018/050616 on May 25, 2018, now abandoned.

(Continued)

(51) Int. Cl.
    *C02F 1/32*          (2023.01)
    *A61L 2/10*          (2006.01)
    (Continued)

(52) U.S. Cl.
    CPC ............... *C02F 1/325* (2013.01); *A61L 2/10* (2013.01); *A61L 2/26* (2013.01); *A61L 2202/11* (2013.01);

(Continued)

(58) Field of Classification Search
CPC ...... C02F 1/32; C02F 1/72; C02F 1/78; C02F 1/48; C02F 1/46; A61L 2/10; B01D 32/34; B01D 61/10; B01D 61/08
(Continued)

(56) References Cited

U.S. PATENT DOCUMENTS 3,572,391 A    3/1971   Hirsch
4,101,777 A    7/1978   Reid
(Continued)

FOREIGN PATENT DOCUMENTS

CA           2231990        9/1998
CN           2460095 Y     11/2001
(Continued)

OTHER PUBLICATIONS

Fluid Sterilizer; JP 6080937 B1; Date Filed Dec. 8, 2015 (Year: 2015).*

(Continued)

*Primary Examiner* — Akash K Varma
(74) *Attorney, Agent, or Firm* — GREENBLUM & BERNSTEIN, P.L.C.

(57) ABSTRACT

Aspects of exemplary fluid disinfection apparatus and methods are described. One aspect is a disinfection apparatus comprising a body comprising a reflecting chamber, a fluid channel to direct a fluid into reflecting chamber, and radiation source positioned to output a disinfecting radiation into the chamber. The body may include an inlet and outlet. For example, the inlet may extend through the body to receive a fluid at a first velocity; the reflecting chamber may extend along an axis of the body; and the outlet may extend through an end of the reflecting chamber to discharge the fluid from the body. In this example, the fluid channel may direct the fluid from the inlet into the reflecting chamber at a second velocity smaller than the first velocity; and the radiation (Continued)

source may be positioned to output the disinfecting radiation into the reflecting chamber toward the outlet.

30 Claims, 14 Drawing Sheets

Related U.S. Application Data

(60) Provisional application No. 62/511,955, filed on May 26, 2017.

(51) Int. Cl.
*A61L 2/26* (2006.01)
*C02F 1/72* (2023.01)

(52) U.S. Cl.
CPC ... *A61L 2202/121* (2013.01); *A61L 2202/122* (2013.01); *C02F 1/725* (2013.01); *C02F 2201/3221* (2013.01); *C02F 2201/3222* (2013.01); *C02F 2201/3228* (2013.01); *C02F 2201/328* (2013.01); *C02F 2303/04* (2013.01); *C02F 2305/10* (2013.01)

(58) Field of Classification Search
USPC ...................................................... 210/748.1
See application file for complete search history.

(56) References Cited

U.S. PATENT DOCUMENTS

| | | | |
|---|---|---|---|
| 5,597,482 A | 1/1997 | Melyon | |
| 6,099,799 A | 8/2000 | Anderson | |
| 6,228,332 B1 | 5/2001 | Dunn et al. | |
| 6,447,721 B1 | 9/2002 | Horton, III et al. | |
| 6,454,937 B1 | 9/2002 | Horton et al. | |
| 6,773,584 B2 | 8/2004 | Saccomanno | |
| 6,773,854 B2 | 8/2004 | Saccomanno | |
| 7,001,571 B2 | 2/2006 | Forney et al. | |
| 7,169,311 B2 | 1/2007 | Saccomanno | |
| 7,396,459 B2 | 7/2008 | Thorpe | |
| 7,498,004 B2 | 3/2009 | Saccomanno | |
| 7,507,370 B2 | 3/2009 | Forney et al. | |
| 7,534,356 B2 | 5/2009 | Saccomanno | |
| 7,695,675 B2 | 4/2010 | Kaiser et al. | |
| 7,981,285 B2 | 7/2011 | Thorpe | |
| 8,080,165 B2 | 12/2011 | Forney | |
| 8,405,046 B2 | 3/2013 | Necamp | |
| 8,591,730 B2 | 11/2013 | Yong et al. | |
| 8,980,178 B2 | 3/2015 | Gaska et al. | |
| 9,533,896 B2 | 1/2017 | Lee et al. | |
| 9,938,165 B2 | 4/2018 | Taghipour | |
| 9,999,696 B2 | 6/2018 | Blechschmidt et al. | |
| 10,293,072 B2 | 5/2019 | Taghipour | |
| 10,472,260 B2 | 11/2019 | Mochizuki et al. | |
| 10,829,394 B2 | 11/2020 | Taghipour | |
| 2003/0049809 A1 | 3/2003 | Kaiser et al. | |
| 2003/0086848 A1 | 5/2003 | Saccomanno | |
| 2003/0089670 A1 | 5/2003 | Saccomanno | |
| 2004/0126273 A1 | 7/2004 | Forney et al. | |
| 2004/0222163 A1 | 11/2004 | Saccomanno | |
| 2005/0000911 A1 | 1/2005 | Thorpe | |
| 2005/0056597 A1 | 3/2005 | Fries et al. | |
| 2005/0163648 A1 | 7/2005 | Liang | |
| 2006/0011556 A1 | 1/2006 | Ueberall | |
| 2006/0159814 A1 | 7/2006 | Forney et al. | |
| 2006/0186059 A1 | 8/2006 | Saccomanno | |
| 2007/0003430 A1 | 1/2007 | Kaiser et al. | |
| 2009/0081340 A1 | 3/2009 | Forney | |
| 2009/0095691 A1 | 4/2009 | Thorpe | |
| 2010/0224562 A1 | 9/2010 | Rolchigo et al. | |
| 2011/0250099 A1 | 10/2011 | Bagwell et al. | |
| 2013/0119266 A1 | 5/2013 | Mondt et al. | |
| 2013/0153514 A1 | 6/2013 | Stern et al. | |
| 2015/0064061 A1 | 3/2015 | Taghipour | |
| 2015/0114912 A1 | 4/2015 | Taghipour | |
| 2015/0144575 A1 | 5/2015 | Hawkins | |
| 2017/0305762 A1 | 10/2017 | Kolch et al. | |
| 2018/0140729 A1 | 5/2018 | Kiuchi et al. | |
| 2018/0257953 A1 | 9/2018 | Mochizuki et al. | |
| 2019/0321505 A1 | 10/2019 | Kodama et al. | |
| 2019/0322546 A1 | 10/2019 | Sugiyama et al. | |
| 2020/0171184 A1* | 6/2020 | Tanaka | C02F 1/325 |

FOREIGN PATENT DOCUMENTS

| | | | |
|---|---|---|---|
| CN | 1494436 A | 5/2004 | |
| CN | 1571758 A | 1/2005 | |
| CN | 1653002 A | 8/2005 | |
| CN | 101341095 | 1/2009 | |
| CN | 103068408 | 4/2013 | |
| CN | 204111365 U | 1/2015 | |
| CN | 104780945 A | 7/2015 | |
| CN | 106536421 | 3/2017 | |
| GB | 2 306 463 | 5/1997 | |
| JP | 59-136187 | 8/1984 | |
| JP | 3302247 | 7/2002 | |
| JP | 6080937 | 2/2017 | |
| JP | 6080937 B1 * | 2/2017 | A61L 2/10 |
| KR | 20-0273844 | 4/2002 | |
| KR | 10-2012-0054417 | 5/2012 | |
| WO | WO 03/033413 A1 | 4/2003 | |
| WO | WO 03/095369 A1 | 11/2003 | |
| WO | 2007/029244 | 3/2007 | |
| WO | 2010/071606 | 6/2010 | |
| WO | 2013/176736 | 11/2013 | |
| WO | 2017/043355 | 3/2017 | |
| WO | 2017/124191 | 7/2017 | |

OTHER PUBLICATIONS

International Search Report issued in International Patent Application No. PCT/CA2018/050616, dated Jul. 19, 2018.
International Preliminary Report on Patentability, issued in International Patent Application No. PCT/CA2018/050616, dated Nov. 26, 2019.
Chinese Office Action issued in Chinese Patent Application No. 201880048750.2, dated Nov. 2, 2020 (with English translation).
Extended European Search Report in EP Application No. EP 18 80 5348, issued on Jan. 25, 2021 (in English).
Chinese Office Action issued in Chinese Patent Application No. 201880048750.2, dated Jun. 10, 2021 (with English translation).
Office Action, India Patent Office, issued in India Patent Application No. 201927053234, dated Mar. 3, 2022 (with English translation).
Chinese Office Action in counterpart Chinese Application No. CN 202211148767.X dated Sep. 8, 2023 (with English translation).
Office Action dated May 25, 2024 issued in Chinese patent application No. 202211148767.X, with English machine translation thereof.

* cited by examiner

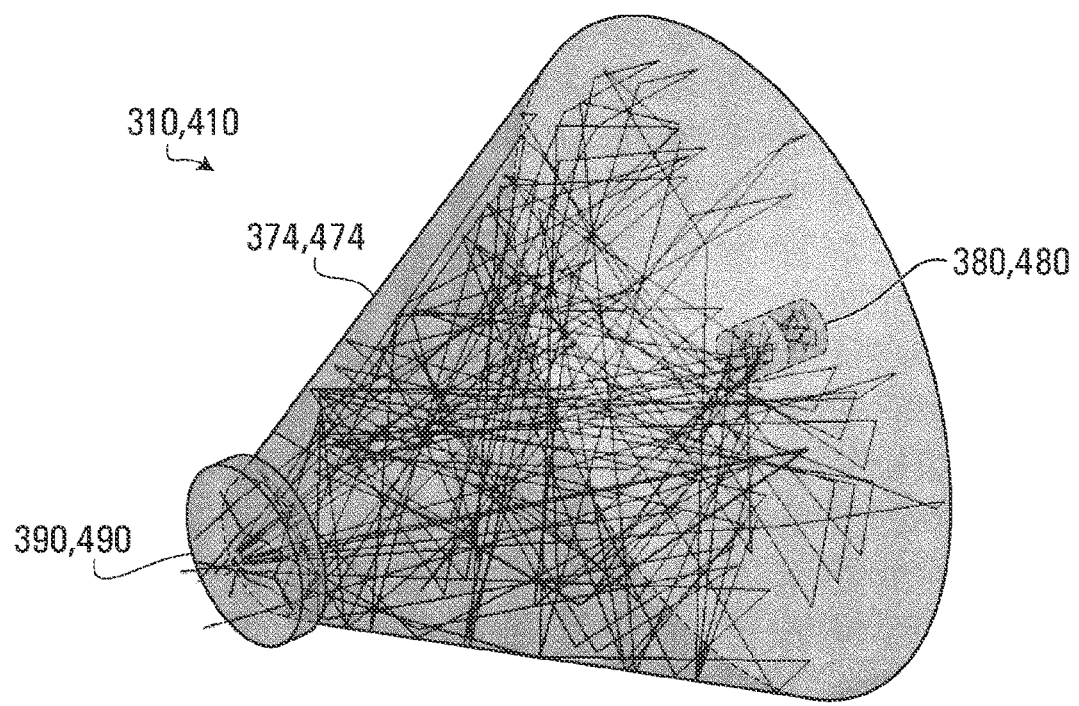
FIG. 13
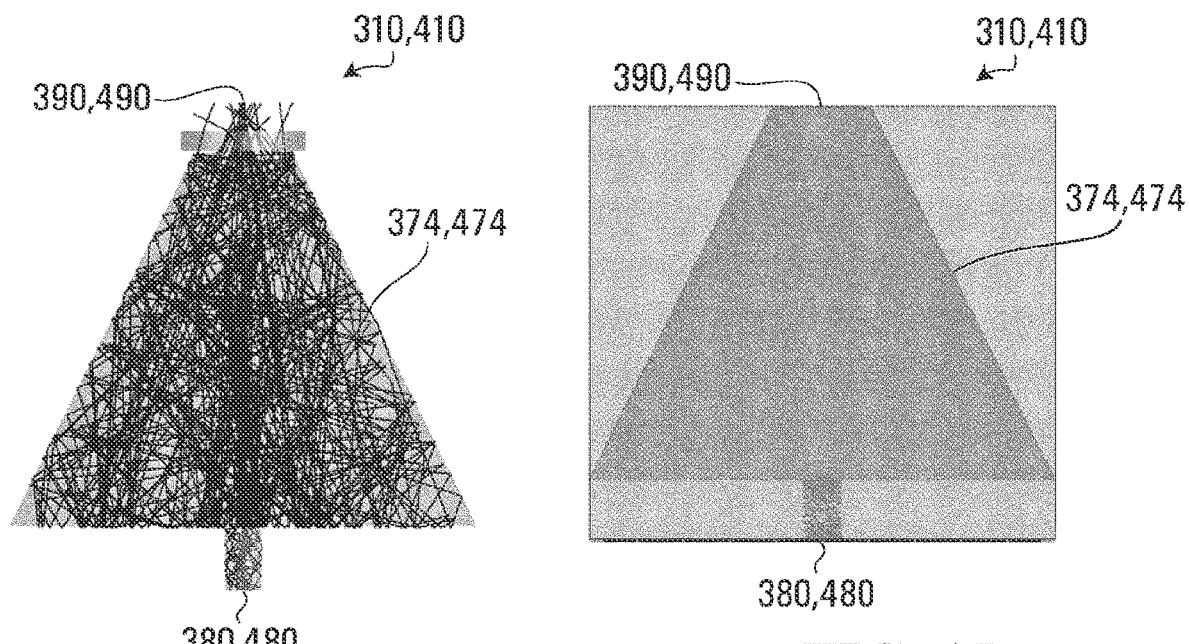
FIG. 14
FIG. 15

FLUID DISINFECTION APPARATUS AND METHODS

CROSS-REFERENCE TO RELATED APPLICATION

The present application is a Continuation of U.S. application Ser. No. 16/616,204, filed at the U.S. Patent and Trademark Office on Nov. 22, 2019, which is the U.S. National Stage of PCT/CA2018/050616, filed May 25, 2018, which claims priority to U.S. Provisional Application No. 62/511,955, filed at the U.S. Patent and Trademark Office on May 26, 2017. The entire disclosure and contents of each of the above-noted applications are hereby incorporated by reference herein in entirety.

TECHNICAL FIELD

This disclosure relates to fluid disinfection apparatus and methods. Particular aspects may comprise an ultraviolet ("UV") photo-reactor.

BACKGROUND

Fluids such as air and water may be exposed to a dose of disinfecting radiation in order to kill microbes and decompose organic contaminants. For example, the fluids may be directed into a chamber, and a UV radiation may be output from a point source in a chamber, such a UV LED or similar radiation source. The dose may be defined as an amount of energy "Q" (mJ per $cm^2$) to which the fluids are exposed from the disinfecting radiation; and calculated as the product of irradiance "I" (mW per $cm^2$) multiplied by a fluid residence time "τ" (s). Aspects of dose Q may be tuned. For example, a more powerful point source of UV radiation may be used to obtain a dose Q of UV radiation by increasing the UV irradiance.

SUMMARY

One aspect of the present disclosure is an exemplary disinfection apparatus. This apparatus may comprise a body. The body may include an inlet extending through the body to receive a fluid at a first velocity; a reflecting chamber extending along an axis of the body; and an outlet extending through an end of the reflecting chamber to discharge the fluid from the body. The apparatus may comprise a fluid channel in the body to direct a fluid from the inlet into the reflecting chamber. For example, the fluid may be directed into the reflecting chamber by the fluid channel at a second velocity smaller than the first velocity. The apparatus also may comprise a radiation source positioned to output a disinfecting radiation into the reflecting chamber toward the outlet. For example, the source may be a UV LED.

The inlet may be generally transverse with the axis, and the outlet may be generally parallel to the axis. In some aspects, the outlet may be coaxial with the axis; and the radiation source may be coaxial with the axis so that a portion of the disinfecting radiation is discharged from the outlet with the fluid. For example, a portion of discharged radiation may further disinfect the fluid downstream of the apparatus. A cross-section of the reflecting chamber across the axis may be circular. The body and the reflecting chamber may include a similar shape or volume along the axis. Any shape or volume may be used. For example, the similar shape or volume may be cylindrical, conical, polygonal, pyramidal, spherical, or prismatic.

Dimensions of the reflecting chamber and the radiation source may be configured to distribute the disinfecting radiation throughout the reflecting chamber. For example, the reflecting chamber may have a length and a diameter, and the length divided by the diameter may be equal to between approximately 0.5 and approximately 2; or between approximately 0.5 and approximately 3. In some aspects, the axis may extend between a first end of the body and a second end of the body; the radiation source may be disposed at the first end; the reflecting chamber may be disposed between the first and second ends; the outlet may extend through the first end; and the inlet may be adjacent the first end.

Interior surfaces of the reflecting chamber may include a reflective material. Any type of reflective material may be used, including UV reflective materials. For example, the fluid channel may at least partially surround the reflecting chamber, and the reflecting chamber may be defined by an internal structure extending along the axis in the body. As a further example, the radiation source may include one or more point sources; and the one or more point sources may emit the disinfecting radiation in a direction generally parallel to the axis.

The apparatus may comprise a window disposed between the radiation source and the reflective chamber. The disinfecting radiation may pass through the window. And the window also may seal the radiation source from the fluid. For example, the disinfecting radiation may include a wavelength of between approximately 200 nm to approximately 320 nm; or may include a peak wavelength of between approximately 230 nm to approximately 300 nm. The radiation source may be a UV-LED, and may include various optical components, such as a lens.

Another aspect of the present disclosure is an exemplary fluid disinfection method. This method may comprise: directing a fluid from an inlet of a body at a first velocity into a reflecting chamber at a second velocity less than the first velocity; exposing the fluid to a disinfecting radiation output into the reflecting chamber toward the outlet; and discharging the fluid from the body out of an outlet extending through an end of the reflecting chamber. In some aspects, the second velocity may be less than 50% of the first velocity.

The body may comprise a fluid channel and directing the fluid may comprise directing the fluid through the fluid channel. The reflecting chamber may have a length and a diameter, and the length divided by the diameter may be equal to between approximately 0.5 and approximately 2; or between approximately 0.5 and approximately 3. The inlet and the outlet may be disposed at one end of the body, and directing the fluid may comprise: directing the fluid from the inlet in a first direction along to the axis; and directing the fluid into reflecting chamber in a second direction along the axis, wherein the first direction is different from the first direction. For example, directing the fluid may comprise directing the fluid from the first direction to the second direction. As a further example, directing the fluid through the fluid channel also may comprise causing the fluid to at least partially surround the reflecting chamber. For example, the fluid may be directed between an interior surface of the body and an exterior surface of the reflecting chamber.

Exposing the fluid to the disinfecting radiation may comprise outputting the disinfecting radiation from a radiation source disposed on the body. For example, the method may comprise diverting the fluid from the fluid channel into the reflecting chamber with an internal surface of the body disposed adjacent the radiation source. The method may comprise outputting the disinfecting radiation towards the outlet, such as from one or more point sources of the radiation source. The inlet may be generally transverse with the outlet, and the method also may comprise discharging at least a portion of the disinfecting radiation out of the outlet with fluid. The method also may comprise causing the disinfecting radiation to be reflected off of reflective surfaces of the reflecting chamber. In some aspects, exposing the fluid to the disinfecting radiation may comprise outputting the radiation through a window disposed between the radiation source and reflecting chamber. For example, the disinfecting radiation may have a wavelength of between approximately 200 nm to approximately 320 nm; or between approximately 230 nm to approximately 290 nm, such that exposing the fluid to the disinfecting radiation may comprise outputting UV radiation.

Yet another aspect of the present disclosure is another disinfection apparatus. This apparatus may comprise: a body comprising an inlet extending through the body to receive a fluid at a first velocity; a reflecting means extending along an axis of the body; and an outlet extending through an end of the reflecting means to discharge the fluid from the body. The apparatus may comprise a flow means in the body to direct a fluid from the inlet into the reflecting means. The fluid may be directed by the flow means at a second velocity smaller than the first velocity. The apparatus also may comprise a radiation means positioned to output a disinfecting radiation into the reflecting means toward the outlet.

The inlet may be generally transverse with the axis, and the outlet may be generally parallel to the axis. In some aspects, the outlet may be coaxial with the axis; and the radiation means may be coaxial with the axis so that a portion of the disinfecting radiation is discharged from the outlet with the fluid. For example, a portion of discharged radiation may further disinfect the fluid downstream of the apparatus. A cross-section of the reflecting means across the axis may be circular. The body and the reflecting means may include a similar shape or volume along the axis. Any shape or volume may be used. For example, the similar shape or volume may be cylindrical, conical, polygonal, pyramidal, spherical, or prismatic.

Dimensions of the reflecting means and the radiation means may be configured to distribute the disinfecting radiation throughout the reflecting means. For example, the reflecting means may have a length and a diameter, and the length divided by the diameter may be equal to between approximately 0.5 and approximately 2; or between approximately 0.5 and approximately 3. In some aspects, the axis may extend between a first end of the body and a second end of the body; the radiation means may be disposed at the first end; the reflecting means may be disposed between the first and second ends; the outlet may extend through the first end; and the inlet may be adjacent the first end.

Interior surfaces of the reflecting means may include a UV reflective material. Any type of reflective material may be used, including UV reflective materials. For example, the flow means may at least partially surround the reflecting means, and the reflecting means may be defined by an internal structure extending along the axis in the body. As a further example, the radiation means may include one or more point sources; and the one or more point sources may emit the disinfecting radiation in a direction generally parallel to the axis.

The apparatus also may comprise a transmitting means disposed between the radiation means and the reflective means. The disinfecting radiation passes through the transmitting means. And the transmitting means may seal the radiation means from the fluid. For example, the disinfecting radiation may include a wavelength of between approximately 200 nm to approximately 320 nm; or a peak wavelength of between approximately 230 nm to approximately 300 nm. The radiation means may comprise a UV-LED, and may comprise optical means, such as a lens.

Still yet another aspect of the present disclosure is another disinfection apparatus. This apparatus may comprise: a cap attached to a body; an inlet extending through the body to receive a fluid; a reflecting chamber extending along an axis of the body; and an outlet extending through the reflecting chamber to discharge the fluid from the body. The cap may comprise a radiation source positioned to output a disinfecting radiation into the reflecting chamber toward the outlet when attached to the body. The body and/or the cap may be composed of a thermally conductive material. For example, the cap may be thermally coupled to the body and the radiation source so that heat from the source may be transferred into the body through the cap. As a further example, the body and/or the cap may be thermally coupled to the fluid (e.g., in contact therewith) so that at least a portion of the heat may be transferred to the fluid to cool radiation source.

Aspects of related kits and systems are also disclosed. It may be understood that both the foregoing summary and the following detailed descriptions are exemplary and explanatory only, neither being restrictive of the inventions claimed below.

BRIEF DESCRIPTION OF THE DRAWINGS

The accompanying drawings, which are incorporated in and constitute a part of this specification, illustrate exemplary aspects that, together with the written descriptions, serve to explain the principles of this disclosure.

FIG. 13 depicts another exemplary irradiance distribution.

FIG. 14 depicts another exemplary irradiance distribution.

FIG. 15 depicts another exemplary absolute incoherent irradiance.

DETAILED DESCRIPTION

Aspects of the present disclosure are now described with reference to exemplary fluid disinfection apparatus and methods. Some aspects are described with reference to a body comprising a reflecting chamber, a fluid channel to direct a fluid into the reflecting chamber, and a radiation source to output a dose Q (mJ per cm²) of a disinfecting radiation into the reflecting chamber. Dose Q may be calculated as the product of irradiance "I" (mW per cm²) multiplied by a fluid residence time "τ" (s) ("Equation 1"). For example, the reflecting chamber and fluid channel may include interconnecting volumes in the body; the radiation source may be a UV point source, such as a UV LED; and the disinfecting radiation may include a UV radiation. Unless claimed, these examples are provided for convenience and not intended to limit the present disclosure. Accordingly, the concepts described in this disclosure may be utilized for any analogous apparatus or method, using any type of disinfecting radiation.

Numerous axes are described. In particular, a set of three directional axes may be described, including an X-X axis, a Y-Y axis, and a Z-Z axis. Each axis may be transverse with the next so as to establish a coordinate system. The term "transverse" means: lying, or being across; set crosswise; or made at right angles to an axis, and includes perpendicular and non-perpendicular arrangements. The term "longitudinal" may be used to describe relative components and features. For example, longitudinal may refer to an object having a first dimension or length that is longer in relation to a second dimension or width. These directional terms are provided for convenience and do not limit this disclosure unless claimed.

As used herein, the terms "comprises," "comprising," or any other variation thereof, are intended to cover a non-exclusive inclusion, such that an apparatus, method, or element thereof comprising a list of elements does not include only those elements, but may include other elements not expressly listed or inherent the apparatus or method. Unless stated otherwise, the term "exemplary" is used in the sense of "example," rather than "ideal." Various terms of approximation may be used in this disclosure, including "approximately" and "generally." Approximately means within plus or minus 10% of a stated number.

Figure 1:
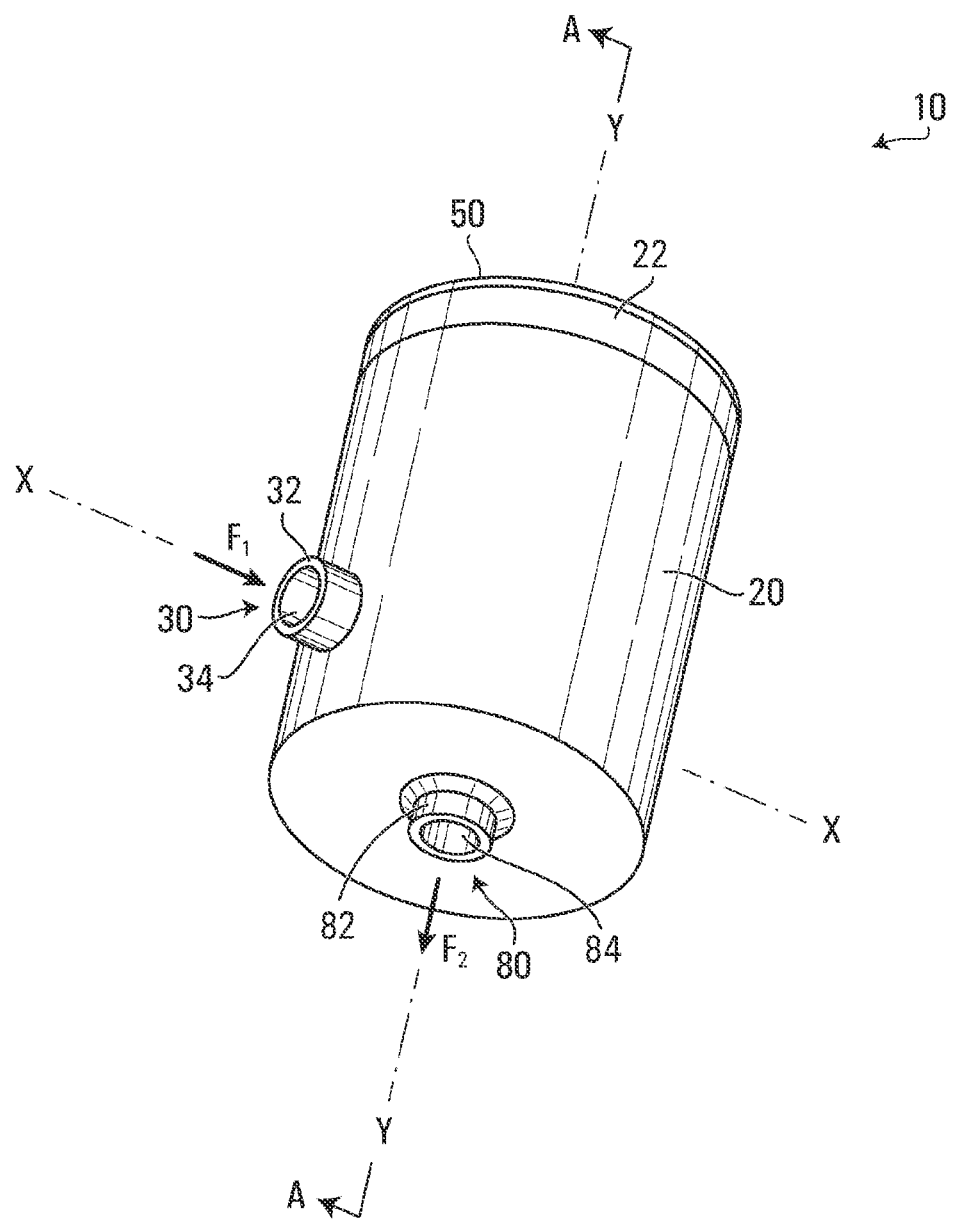
FIG. 1 depicts an exemplary fluid disinfection apparatus.

Aspects of an exemplary disinfection apparatus 10 are now described. As shown in FIG. 1, disinfection apparatus 10 may comprise hydrodynamic and optical aspects operable with a radiation source 90 to deliver an optimal energy dose Q of a disinfecting radiation to a first fluid $F_1$. Numerous hydrodynamic and optical aspects of apparatus 10 are described with respect to an exemplary body 20, shown in FIG. 1 as extending along an axis Y-Y. As shown, body 20 may comprise: an inlet 30 to a fluid chamber 40, a cap 50, a reflecting chamber 70 in fluid chamber 40, and an outlet 80 from chamber 70.

Inlet 30 may extend through any portion of body 20 to input first fluid $F_1$. As shown in FIG. 1, inlet 30 may comprise an inlet structure 32 extending outwardly from body 20 along an axis X-X and a lumen 34 extending through body 20 along axis X-X for communication with fluid chamber 40. For example, first fluid $F_1$ may be input to lumen 34 from a first hose or tube engageable with inlet structure 32.

Figure 2:
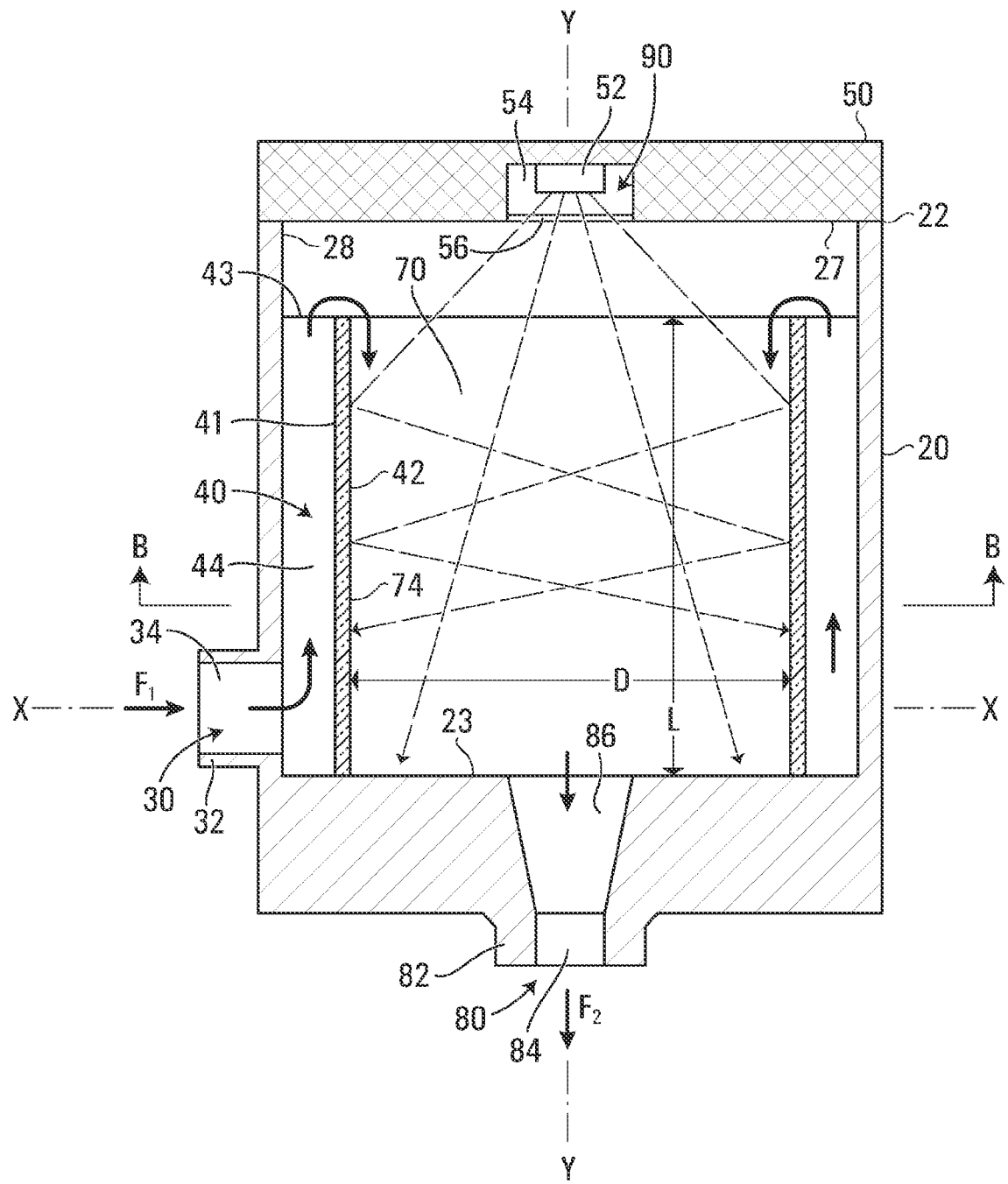
FIG. 2 depicts a section view of the FIG. 1 apparatus taken along a section line A-A depicted in FIG. 1.

Fluid chamber 40 may comprise one or more interior shapes or volumes. At least two of the interior shapes volumes may be interconnecting. As shown in FIG. 2, for example, an interior structure 42 may be located in fluid chamber 40 to define two interconnected interior shapes or volumes, including a flow channel 44 and reflecting chamber 70. For example, flow channel 44 may be a first interconnecting shape or volume on an exterior side of structure 42, and reflecting chamber 70 may be a second interconnecting shape or volume on an interior side of structure 42. In this example, first fluid $F_1$ may: (i) enter through inlet 30; (ii) pass through body 20 in lumen 34; (iii) enter flow channel 44; (iv) be directed into reflecting chamber 70 by channel 44; (v) be exposed to the disinfecting radiation in chamber 70; and (v) exit through outlet 80 as a second fluid $F_2$. Because of the disinfecting radiation, second fluid $F_2$ may be different from first fluid $F_1$. For example, first fluid $F_1$ may contain a first quantity of contaminants (e.g., microbes and organic contaminants), second fluid $F_2$ may contain a second quantity of contaminants (e.g., microbes and organic contaminants), and the second quantity may be less than the first quantity, making fluid $F_2$ disinfected relative to fluid $F_1$. As described below, other characteristics of second fluid $F_2$ also may be different from first fluid $F_1$, such as velocity and temperature.

Figure 3:
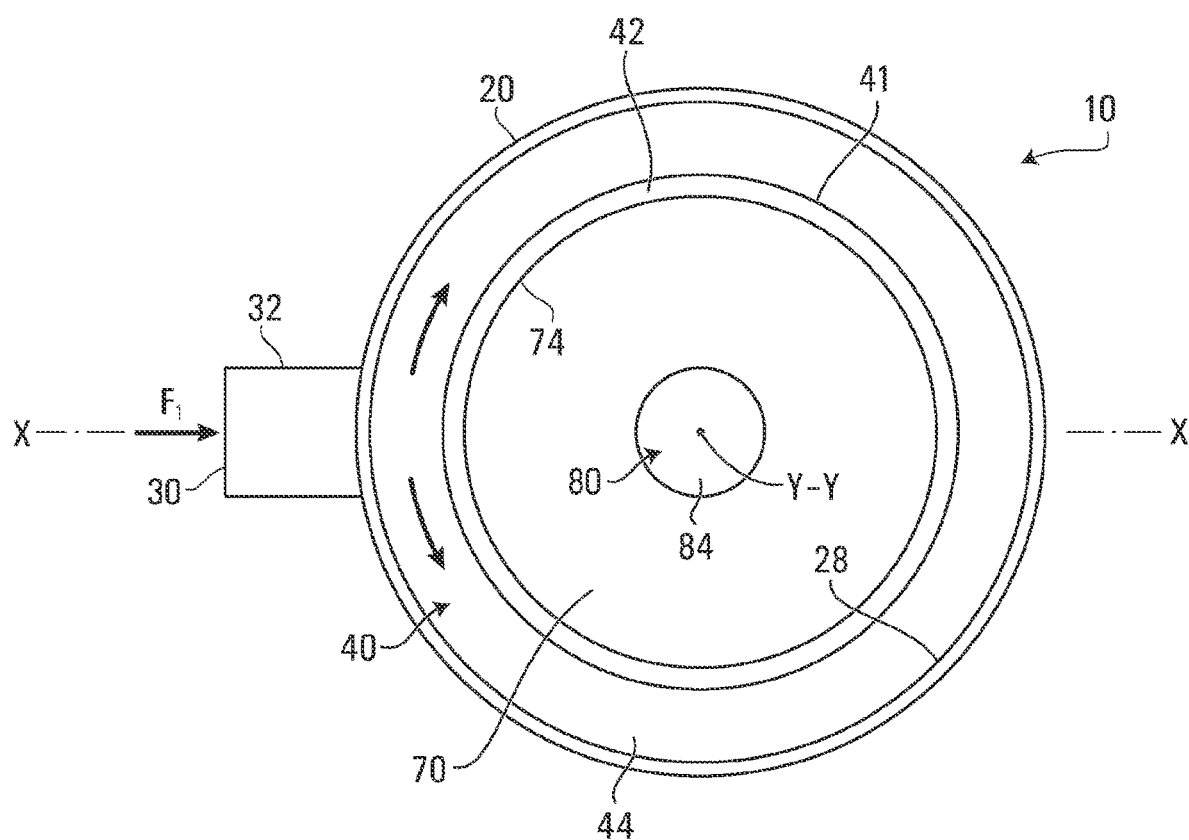
FIG. 3 depicts a top-down view of the FIG. 1 apparatus taken along a section line B-B depicted in FIG. 2.

The one or more interior shapes or volumes of fluid chamber 40 may include the same or different cross-sectional areas. Any regular or irregularly shaped area(s) may be used, including circular, quadrilateral, polygonal, and the like. As shown in FIG. 3, flow channel 44 and reflecting chamber 70 may have circular cross-sectional areas that are coaxial with axis Y-Y. For example, flow channel 44 may comprise an open cylindrical volume extending along axis Y-Y between a first end in communication with lumen 34 and a second end in communication with reflecting chamber 70. In this example, the open cylindrical volume may be defined by: (i) a distance between interior surface 23 of body 20 and an interior elevation 43 in body 20 along axis Y-Y; and (ii) a cross-sectional area about axis Y-Y between an interior surface 28 of body 20 and an exterior surface 41 of structure 42 along the distance. As a further example, flow channel 44 may include a conduit connecting its first and second ends; and the conduit may extend along axis Y-Y, wrap around interior structure 42 about axis Y-Y, or take any other path within fluid chamber 40.

The second end of flow channel 44 may be configured to direct first fluid $F_1$ into reflecting chamber 70. For example, the second end of channel 44 may direct first fluid $F_1$ toward an interior surface 27 of body 20 configured to redirect fluid $F_1$ towards axis Y-Y, over interior structure 42 at interior elevation 43, and into reflecting chamber 70. As shown in FIG. 2, interior surface 27 may be disposed generally transversely with axis Y-Y to direct fluid $F_1$ toward axis Y-Y and into chamber 70. Interior surface 27 may include any number features configured to direct and/or modify the flow of first fluid $F_1$, including curves, protrusions, ridges, and the like.

Cap 50 may be attached to any portion of body 20 and configured to seal fluid chamber 40. As shown in FIG. 2, cap 50 may be attached to a first end 22 of body 20 with any type of sealing elements, including adhesives, heat treatments, threads, and the like. Radiation source 90 may be attached to cap 50 and configured to output a disinfecting radiation into fluid chamber 40. For example, source 90 may include one or more point sources and associated electronic components mounted to in interior compartment 54 on an underside of cap 50. The point source(s) may include an UV-LED, and the disinfecting radiation may include the UV radiation, including any combination of UV-A, UV-B, and UV-C. In some aspects, radiation source 90 and interior compartment 54 may be coaxial with axis Y-Y, as shown in FIG. 2, wherein radiation source 90 is positioned to output the disinfecting radiation into reflecting chamber 70 toward outlet 80 so that a portion of the radiation is discharged from chamber 70 through outlet 80 with first fluid $F_1$. For example, this arrangement may allow one or more UV LEDs apply a first dose Q of UV radiation in reflecting chamber 70 and a second dose Q of UV radiation downstream of chamber 70.

At least one of cap 50 or first end 22 of body 20 may comprise a window 56 configured to seal radiation source 90 within compartment 54 of cap 50. As shown in FIG. 2, compartment 54 may extend into an underside of cap 50 and window 54 may be attached to the underside. For example, window 54 may be composed of a radiation transparent material configured to: (i) seal radiation source 90 within interior compartment 54 when cap 50 is attached to first end 22, and (ii) allow the disinfecting radiation to pass into chamber 40. For example, window 54 may include a quartz or quartz-like material configured to pass UV radiation there through.

As shown in FIGS. 1 and 2, cap 50 may be composed of a thermally conductive material (e.g., aluminum). Cap 50 also may be configured to cool radiation source 90 with first fluid $F_1$. For example, cap 50 may in conductive communication with first fluid $F_1$ and radiation source 90 when attached to body 20, allowing a temperature of fluid $F_1$ to cool point source(s) of radiation source 90. As a further example, the thermally conductive material of cap 50 also may be in conductive communication with a thermally conductive portion of body 20, allowing all or portions of body 20 to provide an additional heat sink.

Any interior surface of fluid chamber 40 may be reflective. For example, interior surfaces of reaction chamber 70 may be defined by interior structure 42, and at least those surfaces may be made of or coated with the reflective material. As shown in FIG. 2, for example, the interior surfaces of chamber 70 may have a cylindrical surface area, and at least that surface area inside fluid chamber 40 may be reflective. Any type of reflective material may be used, including UV reflective materials. For example, the UV reflective material may comprise one or more of a polytetrafluoroethylene ("PTFE"), a low density PTFE, aluminum, and a Teflon or Teflon-like material configured to provide high level of diffuse reflectance. In some aspects, the interior surfaces of structure 42 may comprise a semiconducting photo-catalyst material. For example, the photo-catalyst material may be activated by UV radiation (e.g., UV-C) and utilized to degrade organic compounds and deactivate air and/or water borne pathogens. Interior surfaces of body 20 and/or exterior surfaces of interior structure 42 also may be reflective. Alternatively still, interior structure 42 may be transparent to the disinfecting radiation and at least interior surface 27 of body 20 may be reflective. For example, body 20 may be composed of aluminum, interior surface 27 may be coated with a UV reflective material, and interior structure 42 may be composed of a UV translucent material.

In some aspects, inlet, 30, flow channel 44, reflecting chamber 70, and/or outlet 80 may include mixing elements, such as baffles configured to further adjust the hydrodynamics of first fluid $F_1$ within fluid chamber 40. Additional heating elements (e.g., electric coils) also may be included. For example, the mixing elements and/or outlet 80 may be configured to heat first fluid $F_1$ to a desired usage temperature. As a further example, various surfaces of interior structure 42 may be configured as a mixing and/or heating element.

Outlet 80 may extend through any portion of body 20 to discharge second fluid $F_2$ from body 20. As shown in FIG. 1, outlet 80 may comprise an outlet structure 82 extending outwardly from body 20 along axis Y-Y and a lumen 84 extending through body 20 along axis Y-Y to discharge second fluid $F_2$ through interior surface 23 of body 20 and/or chamber 70. For example, second fluid $F_2$ may be discharged from lumen 84, out of body 20, and into a second hose or tube engageable with outlet structure 82. Portions of outlet 80 may be used to modify characteristics of first fluid $F_1$. As shown in FIG. 2, for example, lumen 84 may have a consistent diameter along axis Y-Y, and outlet 80 may comprise an optional throttling portion 86 with a diameter that varies along axis Y-Y to modify (e.g., slightly increase) a velocity of first fluid $F_1$ before being discharged from body 20 as second fluid $F_2$.

As shown in FIG. 2, at least an opening of lumen 84 may be coaxial with axis Y-Y, and thus aligned with radiation source 90 along axis Y-Y. Because of this alignment, a larger portion of the disinfecting radiation may be discharged from reflecting chamber 70 through lumen 84 with second fluid $F_2$, allowing for further disinfection downstream of apparatus 10. For example, interior surfaces of lumen 84 and/or the second hose or tube may be made of or coated with a reflective material similar to above. As also shown in FIG. 2, optional throttling portion 86 may have a larger opening than lumen 84, allowing even more the disinfecting radiation to be discharged.

As shown in FIG. 2, inlet 30 may be generally transverse with outlet 80 so that the interconnecting volumes of flow channel 44 and interior structure 42 may be used to modify a characteristic of first fluid $F_1$. For example, lumen 34 of inlet structure 32 may include a cross-sectional shape extending along axis X-X, lumen 84 of outlet structure 82 may include a cross-sectional shape extending along axis Y-Y, and axis X-X may be generally transverse with axis Y-Y. As shown in FIG. 3, the cross-sectional shape of lumen 84 and/or outlet structure 82 may be coaxial with axis Y-Y. Any shapes may be used, including the circular shapes shown in FIG. 3. The characteristic may include a velocity of first fluid $F_1$. For example, fluid chamber 40 may be configured to receive first fluid $F_1$ at inlet 30 at a first velocity and direct fluid $F_1$ into reflecting chamber 70 at a second velocity less than the first velocity. At least the first velocity may be a jet flow velocity. Interior structure 42 may be configured to transition fluid $F_1$ into the second velocity in chamber 70. In this example, the comparatively slower second velocity of first fluid $F_1$ in chamber 70 may increase the residence time for fluid $F_1$, allowing for delivery of an optimal dose Q of the disinfecting radiation to fluid $F_1$ as it passes through body 20.

In some aspects, disinfection apparatus 10 may be configured to realize a reduced velocity in or across fluid chamber 70 and distribute the disinfecting light throughout reflecting chamber 70, resulting in an optimal dose Q distribution across disinfection apparatus 10, as expressed by Equation (1).

Figure 6:
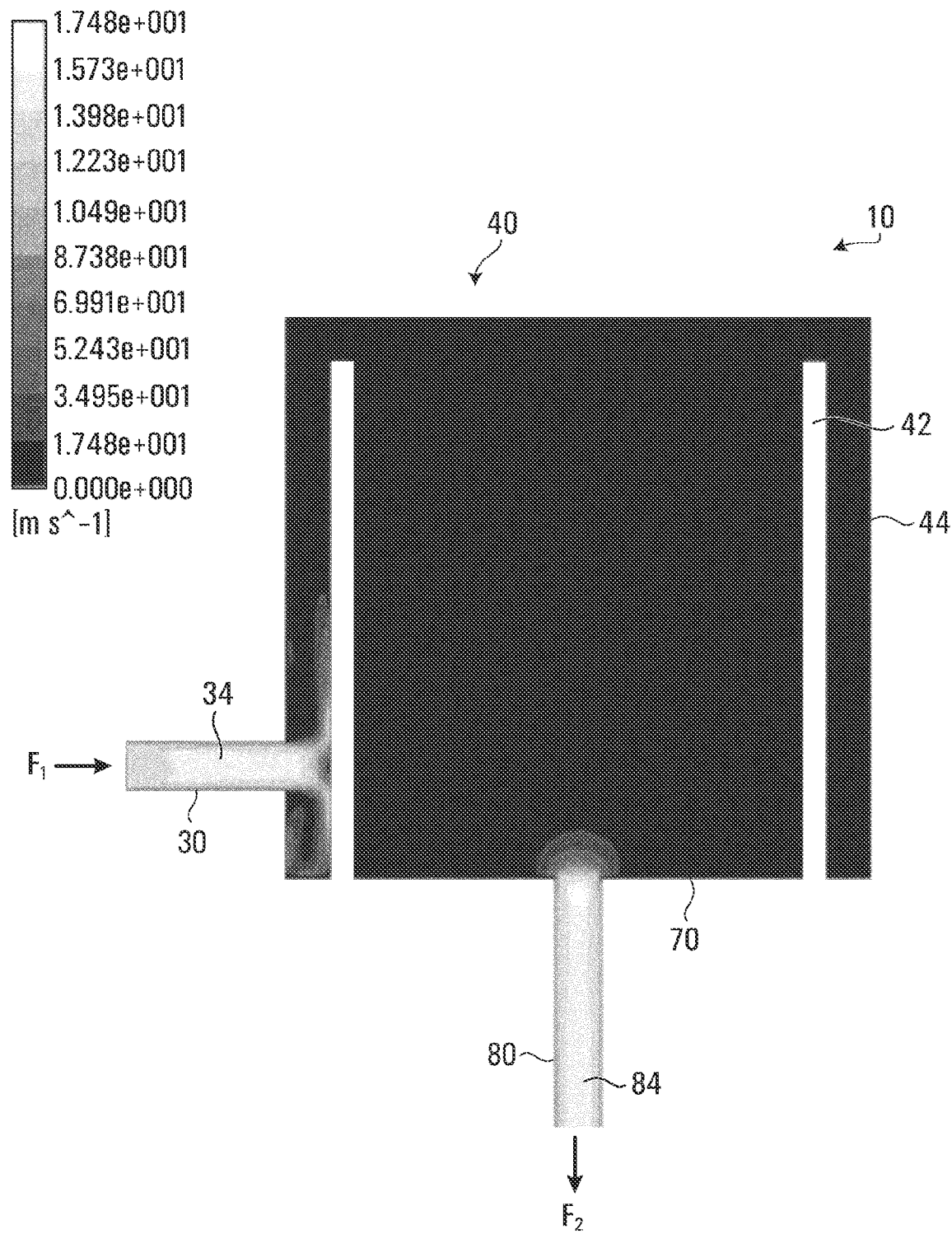
FIG. 6 depicts an exemplary fluid velocity contour.

Results from an exemplary computational fluid dynamics (CFD) simulation are shown in FIG. 6. As shown, the above-described configurations of fluid chamber 40 (e.g., including interior structure 42) may significantly reduce the first velocity of first fluid $F_1$ at inlet 30 to the slower, second velocity first fluid $F_1$ inside reflecting chamber 70, providing a reduced velocity distribution in chamber 70, where the majority of the disinfection takes place.

Figure 4:
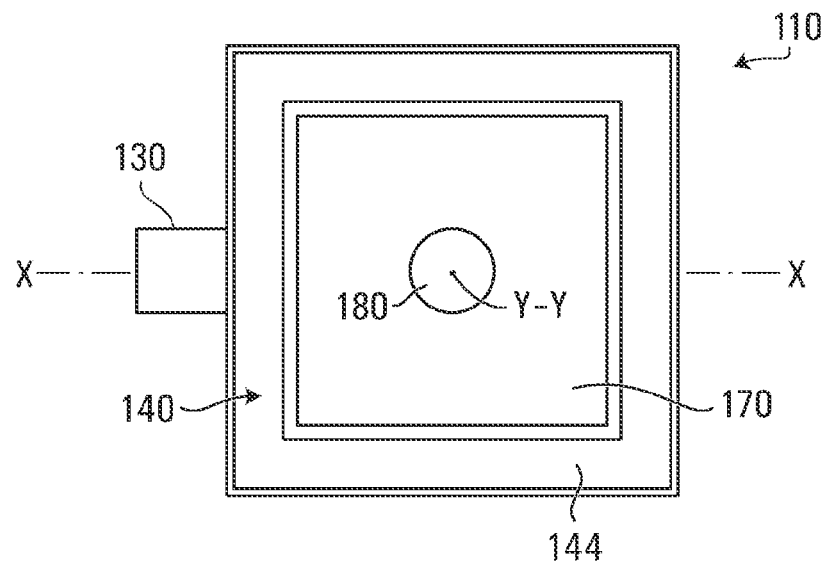
FIG. 4 depicts a top-down view of another exemplary fluid disinfection apparatus.
Figure 5:
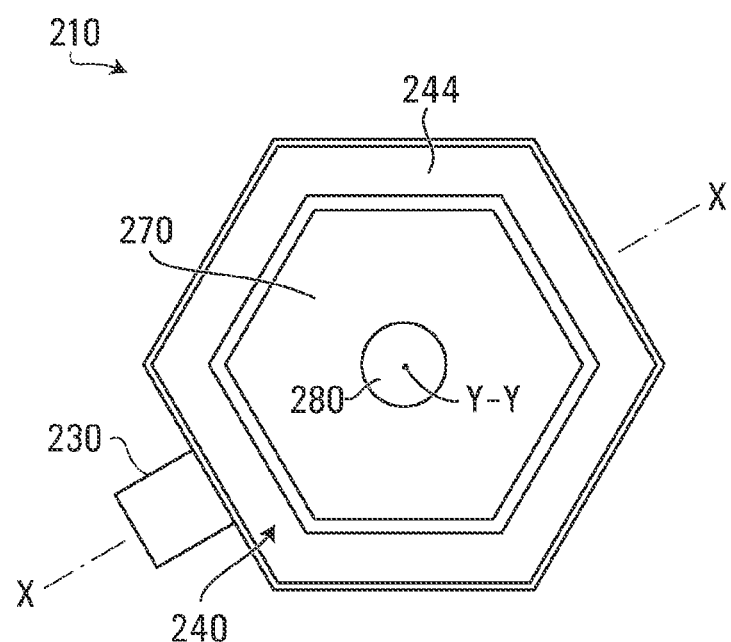
FIG. 5 depicts a top-down view of another exemplary fluid disinfection apparatus.
Figure 7:
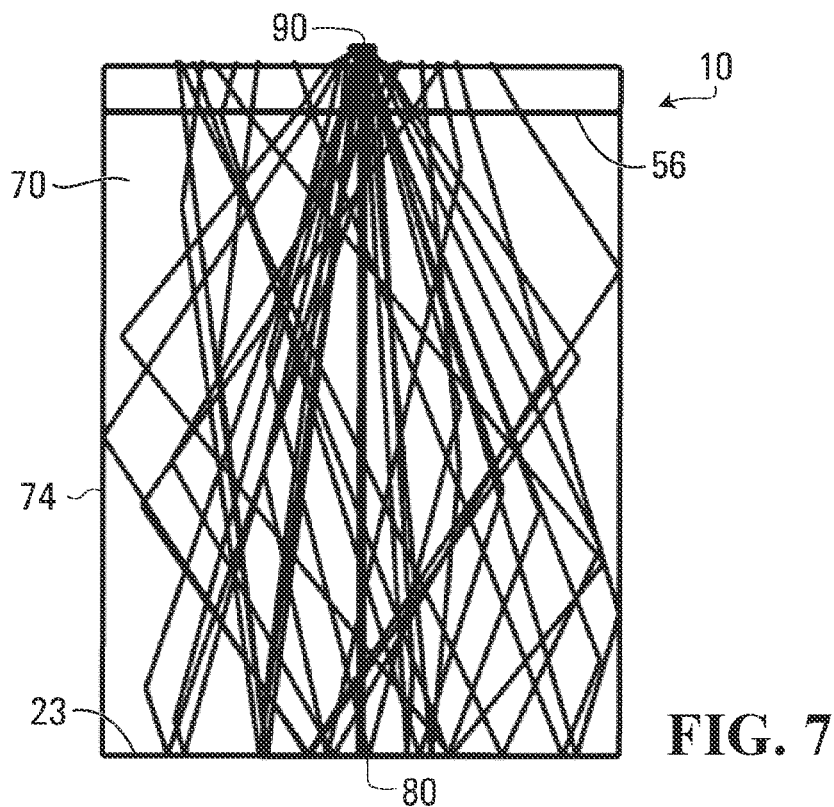
FIG. 7 depicts an exemplary irradiance distribution.
Figure 8:
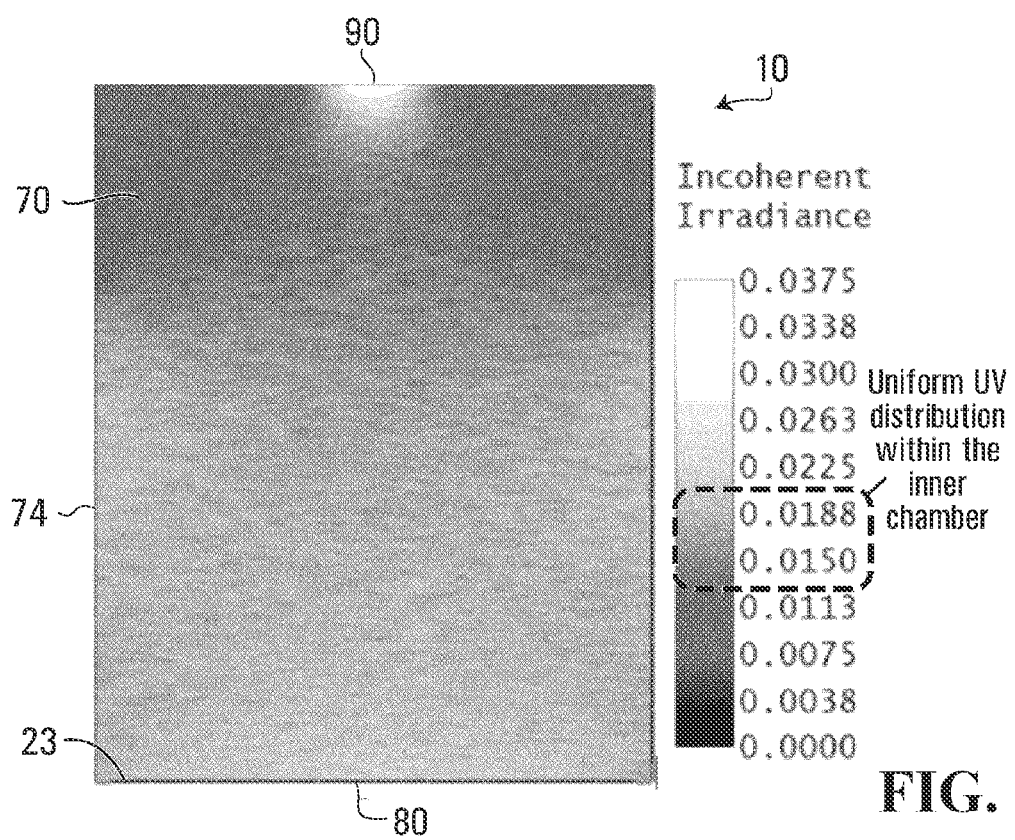
FIG. 8 depicts an exemplary absolute incoherent irradiance.

As shown in FIG. 7, radiation source 90 may output the disinfecting radiation into reflecting chamber 70, and at least interior surfaces 74 of chamber 70 may be configured to maximize the effectiveness of the radiation by reflecting it within chamber 70. As shown, a portion of the disinfecting radiation may be emitted from radiation source 90, passed through window 56, and reflected between interior surfaces 74 of chamber 70. The cross-section of reflecting chamber 70 may be varied without affecting functionality. For example, although shown with reference to apparatus 10, which has a circular shape, FIG. 7 may be likewise applicable to the quadrilateral shape of apparatus 110 of FIG. 4, which comprises an inlet 130, a fluid chamber 140, a flow channel 144, a reflecting chamber 170, and an outlet 180 similar to counterpart elements of apparatus 10; or the polygonal shape of apparatus 210 of FIG. 5, which comprises an inlet 230, a fluid chamber 240, a flow channel 244, a reflecting chamber 270, and an outlet 280 similar to counterpart elements of apparatus 10. An exemplary irradiance distribution for the disinfecting radiation within reflecting chamber 70 is shown in FIG. 8. As shown, a similar irradiance may be achieved across most of reflecting chambers 70, 170, and 180.

A performance of disinfection apparatus 10 may be relative to dimensions of reflecting chamber 70, such as an aspect ratio. As shown in FIG. 2, an aspect ratio "AR" may be defined as the quotient of a first dimension or length "L" of reflecting chamber 70 along axis Y-Y divided by a second dimension or depth "D" of chamber 70 along axis X-X. In FIGS. 2 and 3, for example, where reflecting chamber 70 has a circular cross-sectional shape, the second dimension or depth D may be a diameter of the circular shape. The definition of hydraulic diameter may be used to determine the AR of non-circular shapes, such as the quadrilateral shape of reflecting chamber 170 of FIG. 4 or the polygonal shape of reflecting chamber 270 of FIG. 5, in which the AR may be equal to the product of four multiplied by an area of the shape "A" and a wetted perimeter of the cross-section "P".

As shown in FIG. 8, the AR of interior chamber 70 may significantly affect power conservation along the length L of chamber 70. For example, in FIG. 8, it is shown that extending the length L of chamber 70 along axis Y-Y while maintaining a volume of chamber 70 causes the total UV power to decrease significantly along length L, resulting in a minimal dose delivery after a certain length L. Because this minimal dose may not be sufficient for disinfection, FIG. 8 also demonstrates the benefit of optimizing the AR of exemplary geometric configurations to maximize the delivery of dose Q within reflecting chamber 70.

Figure 9:
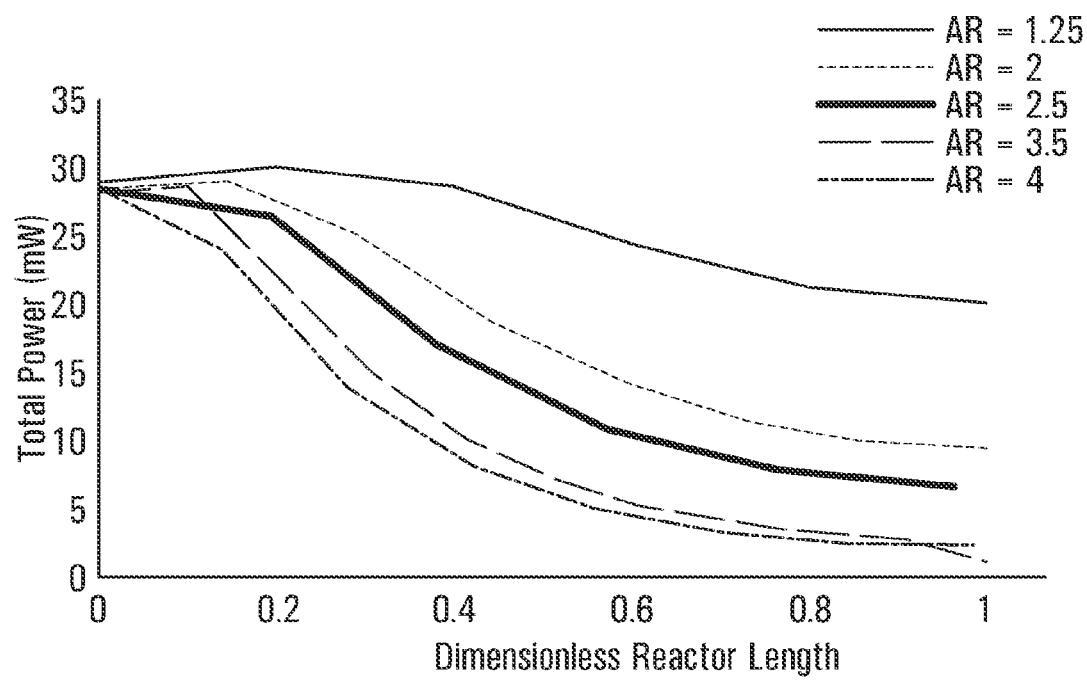
FIG. 9 depicts an exemplary diagram of total power.
Figure 10:
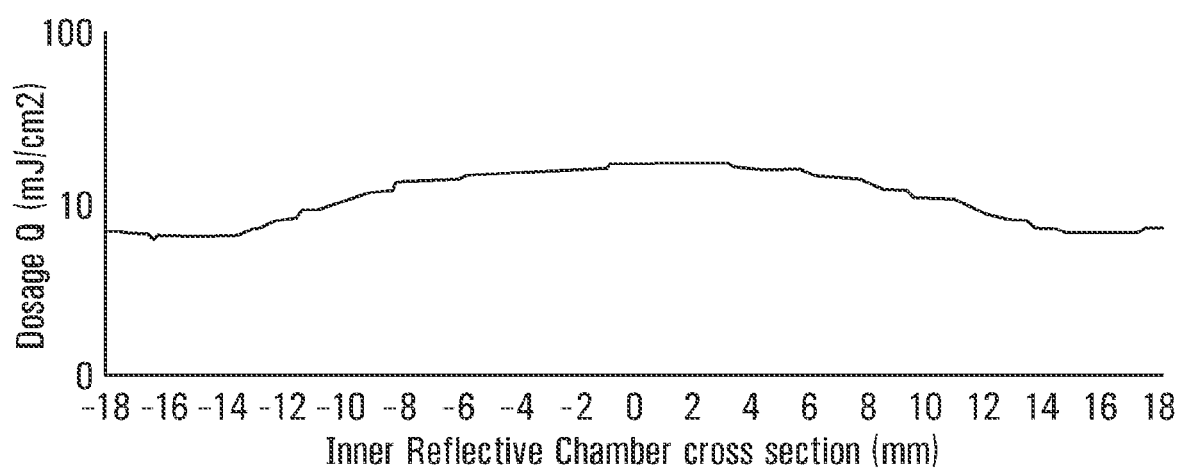
FIG. 10 depicts an exemplary diagram of average dose.

An exemplary average distribution of dose Q across reflecting chamber 70 is depicted in FIG. 9, demonstrating how the optical and hydrodynamic aspects of disinfection apparatus 10 may realize an optimal distribution of dose Q.

Additional aspects of disinfection apparatus 10 are now described with reference to exemplary processes, including continuous processes and batch processes. For some continuous processes, where first fluid $F_1$ passes continuously through body 20, dimensions of reflecting chamber 70 including its AR may be optimized such that a reduced velocity of fluid $F_1$ is achieved within chamber 70. In some aspects, an AR greater than or equal to 1 may be utilized.

For other continuous processes, where first fluid $F_1$ likewise passes continuously through body 20, dimensions of reflecting chamber 70 may be further optimized to conserve power through body 20 and maximize the dose Q delivered to first fluid $F_1$. For example, the dimensions of chamber 70 may be optimized so that the disinfecting radiation is provided throughout body 20. For certain shapes or volumes of body 20, such as the cylindrical volume shown in FIGS. 1-3, an AR of approximately 1 may be utilized to minimize power dissipation in body 20.

For the continuous processes, FIG. 7 shows how irradiance may be affected by optimizing the AR of reflecting chamber 70; and FIG. 8 shows how increasing the AR may decrease of the total power within chamber 70 if its volume is kept the same. For some volumes of reflecting chamber 70, and AR less than or equal to 0.5 and greater than or equal to 2 may be utilized to maximize dose Q through body 20 using chamber 70. For example, FIG. 9 shows an average total distribution of dose Q within the cross-section of reflecting chamber 70.

Comparatively, for the batch processes, where a volume of first fluid $F_1$ may be temporarily stored inside reflecting chamber 70, lower ARs may be used if more intense irradiance along reflecting chamber 70 is desired. For example, an AR of less than 1 may be used if the power of radiation source 90 is increased.

Additional aspects are now described with reference to a disinfection apparatus 310, shown conceptually in FIG. 11; a disinfection apparatus 410, shown conceptually in FIG. 12; a disinfection apparatus 510, shown conceptually in FIG. 16; and disinfection apparatus 610, shown conceptually in FIG. 18. Each variation of disinfection apparatus 10, such as apparatus 110, 210, 310, 410, 510, and 610, may include elements similar to those of apparatus 10, but within the respective 100, 200, 300, 400, 500, or 600 series of numbers, whether or not those elements are shown.

Figure 11:
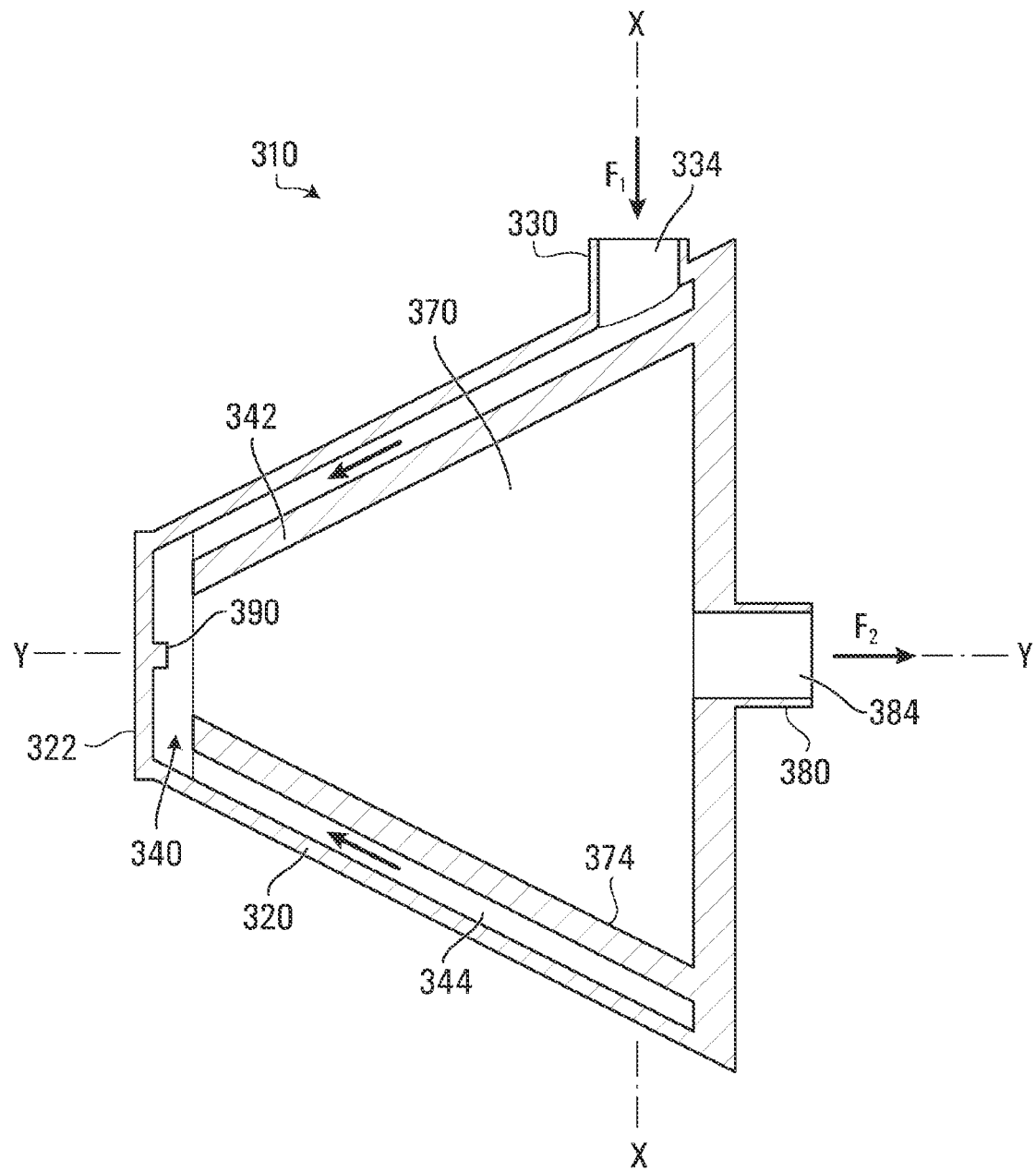
FIG. 11 depicts another exemplary fluid disinfection apparatus.

As shown in FIG. 11, disinfection apparatus 310 may comprise a body 320, an inlet 330, a fluid chamber 340, a fluid channel 344, a reflecting chamber 370, an outlet 380, and a radiation source 390. Body 320 may be conical. For example, body 320 of FIG. 11 includes a truncated cone shape, wherein inlet 330 and outlet 380 are at a first or base end of body 320, and radiation source 390 is at second or truncated end 322 of body 320. Similar to above, apparatus 310 may comprise an interior structure 342 in fluid chamber 340 to define at least two interconnected interior shapes or volumes, including flow channel 344 and reflecting chamber 370. For example, fluid channel 344 and reflecting chamber 370 also may include a truncated cone shape similar to that of body 320 along axis Y-Y.

As also shown in FIG. 11, a first dimension of reflecting chamber 370 adjacent radiation source 390 may be smaller than a second dimension of chamber 370 adjacent outlet 380. The first and second dimensions may be diameters. In some aspects, the first and second dimensions may be configured to modify a characteristic of first fluid $F_1$ in chamber 370. For example, the larger second dimension may increase the residence time of fluid $F_1$ in chamber 370 by causing vortexes and/or other turbulent flow conditions to form adjacent a lumen 384 of outlet 380, further reducing the velocity of first fluid $F_1$ along axis Y-Y.

Figure 12:
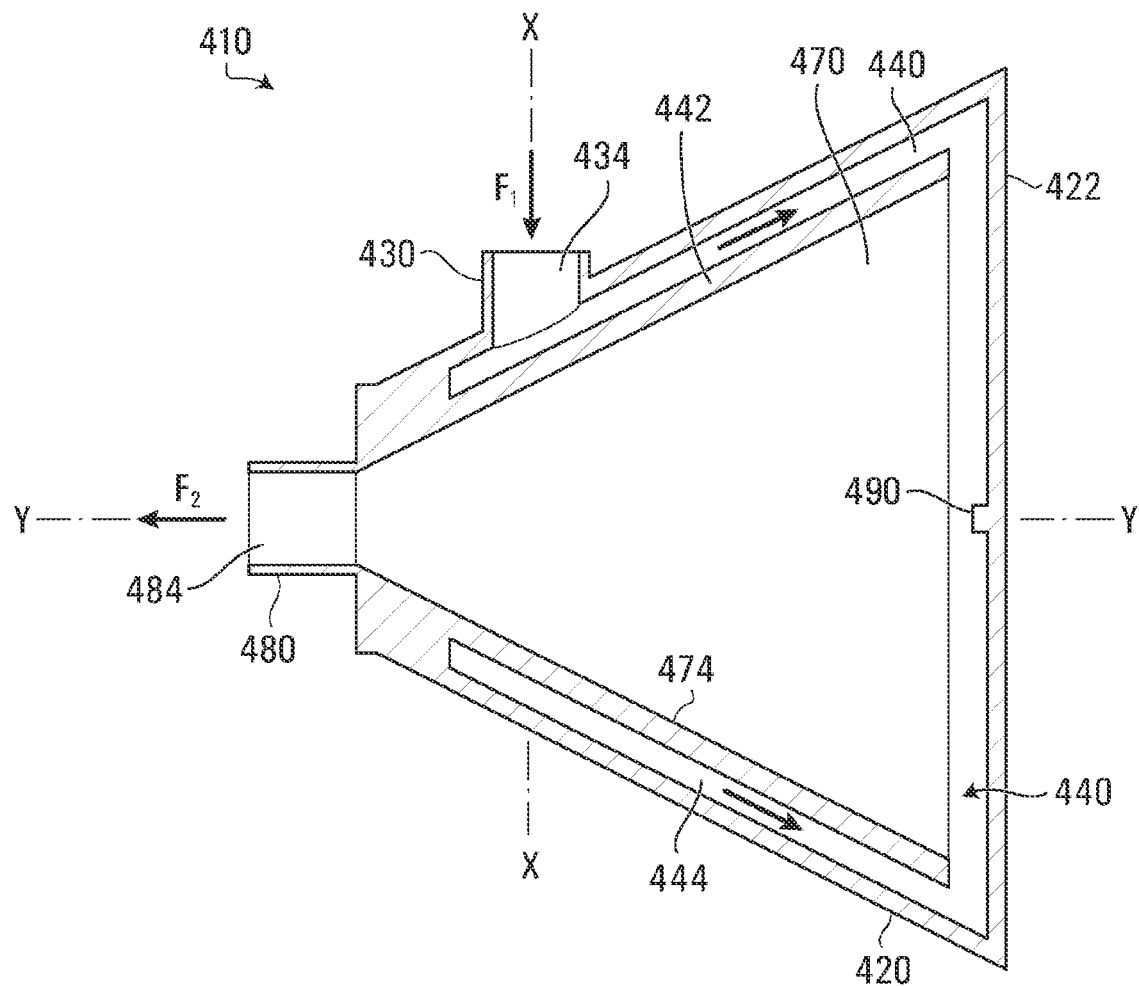
FIG. 12 depicts another exemplary fluid disinfection apparatus.

As shown in FIG. 12, disinfection apparatus 410 may comprise a body 420, an inlet 430, a fluid chamber 440, a fluid channel 444, a reflecting chamber 470, an outlet 480, and a radiation source 490. Body 420 also may be conical. For example, body 420 of FIG. 13 similarly includes a truncated cone shape, wherein inlet 430 and outlet 480 are at a first or truncated end 422 of body 420, and radiation source 490 is at a second or base end of body 420. Similar to above, apparatus 410 may comprise an interior structure 442 in fluid chamber 440 to define at least two interconnected interior shapes or volumes, including flow channel 444 and reflecting chamber 470. For example, fluid channel 444 and reflecting chamber 470 also may include a truncated cone shape similar to that of body 420 along axis Y-Y.

As also shown in FIG. 12, a first dimension of reflecting chamber 470 adjacent radiation source 490 may be larger than a second dimension of chamber 470 adjacent outlet 480. The first and second dimensions may be diameters; and may again modify a characteristic of first fluid $F_1$ in chamber 470. For example, the smaller first dimension may throttle fluid $F_1$ in chamber 470, increasing its velocity along axis Y-Y before being discharged a lumen 484 of outlet 480. As a further example, apparatus 410 may be configure to receive first fluid $F_1$ at a first velocity at inlet 430; reduce the first velocity to a second, slower velocity in a first portion of chamber 470; and gradually transition the second velocity back to the first velocity in a second portion of chamber 470, as may be required in a constant velocity system.

As shown in FIGS. 13 and 14, radiation source 390, 490 may output the disinfecting radiation into reflecting chamber 370, 470; and interior surfaces 374, 474 of chamber 370, 470 and the geometry of the chamber 370, 470 may be configured to maximize the effectiveness of the radiation by reflecting it within chamber 370, 470. In FIGS. 13 and 14, for example, a first portion of the disinfecting radiation may be emitted from radiation source 390, 490 and reflected between interior surfaces 374, 474 of reflecting chamber 370, 470 to irradiate first fluid $F_1$ in chamber 370, 470; and a second portion of the radiation may additionally irradiate second fluid $F_2$ in lumens 384, 484 and downstream thereof. As similarly shown in FIG. 15, a first irradiance may be achieved across most of chamber 370, 470, and a second irradiance may be achieved in lumens 384, 484.

Figure 16:
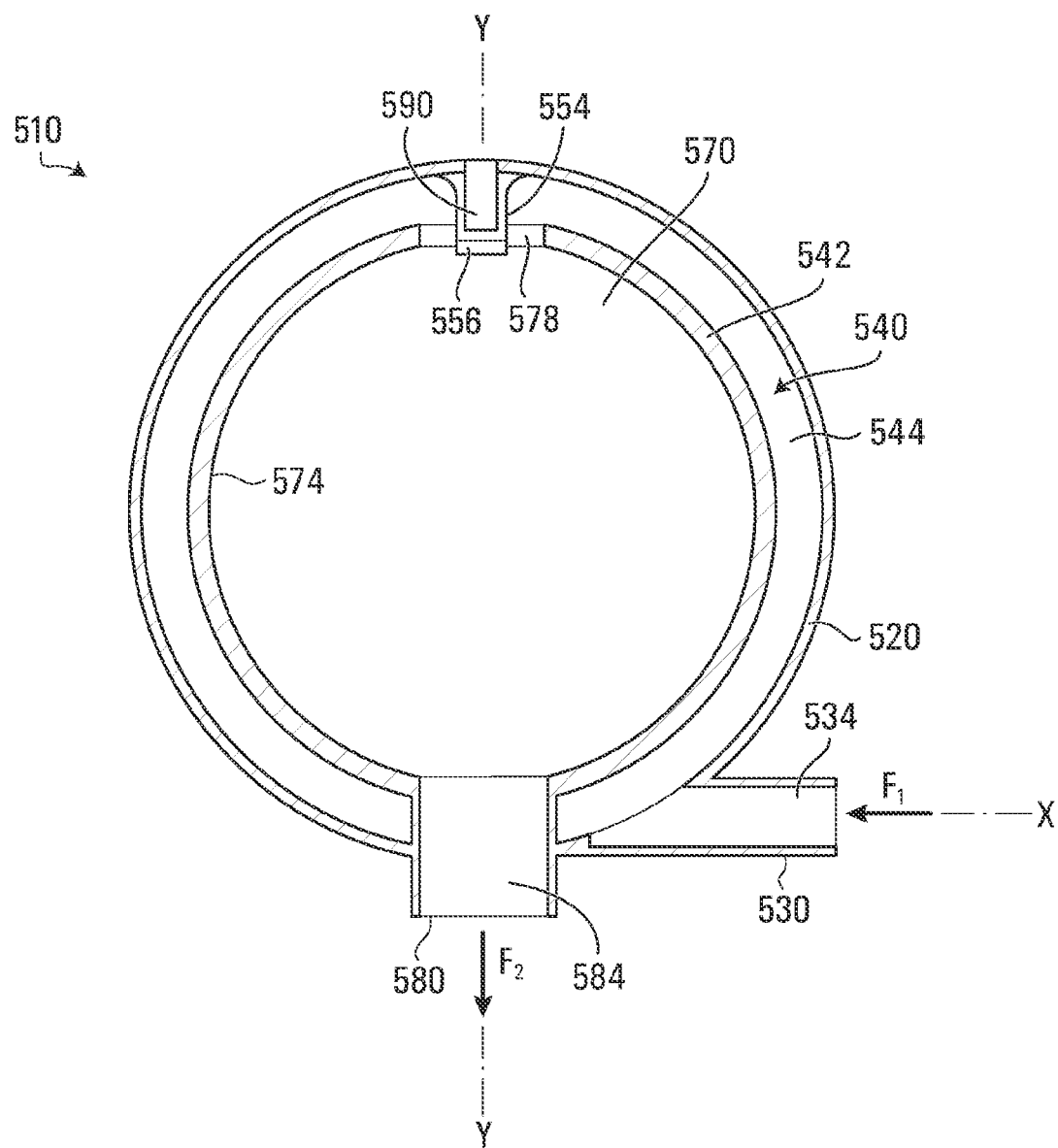
FIG. 16 depicts another exemplary fluid disinfection apparatus.

As shown in FIG. 16, disinfection apparatus 510 may comprise a body 520, an inlet 530, a fluid chamber 540, a fluid channel 544, a reflecting chamber 570, an outlet 580, and a radiation source 590. Body 520 may be spherical. For example, body 520 of FIG. 16 includes a spherical shape, wherein inlet 530 and outlet 580 are disposed adjacent a first end of body 520 and radiation source 590 is disposed adjacent a second, opposite end of body 520. Similar to above, apparatus 510 may comprise an interior structure 542 in fluid chamber 540 to define at least two interconnected interior shapes or volumes, including flow channel 544 and reflecting chamber 570. For example, fluid channel 544 and reflecting chamber 570 may include a spherical shape similar to that of body 520.

Aspects of disinfection apparatus 510 may be modified to accommodate the spherical shape of body 520, fluid channel 544, and/or reflecting chamber 570. For example, radiation source 590 may be spaced apart from an interior surface of body 520. As shown in FIG. 16, reflecting chamber 570 may include an opening 578 in communication with fluid channel 544 and radiation source 590 may be disposed in opening 578. For example, a protrusion 554 may extend inwardly from a first end at body 520 to a second end in opening 578. In this example, radiation source 590 may be located inside of protrusion 554 and configured to output the disinfecting radiation through a window 556 at the second end of protrusion 554. In some aspects, protrusion 554 may have a curved exterior surface and/or a curved transition to body 520 to minimize interference with first fluid $F_1$.

Figure 17:
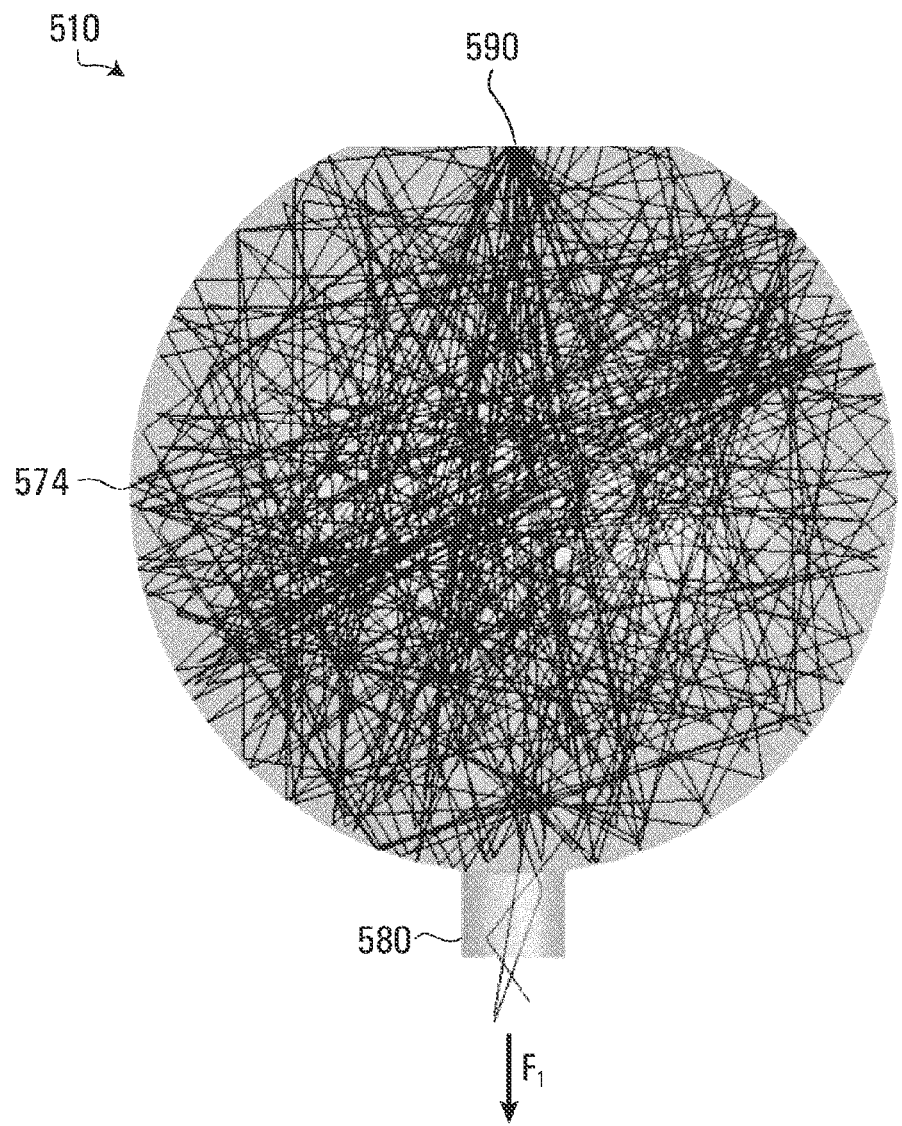
FIG. 17 depicts another exemplary irradiance distribution.

The spherical shape of body 520, fluid channel 544, and/or reflecting chamber 570 may provide hydrodynamic advantages. For example, fluid channel 554 may be defined by interior surfaces of body 520 and exterior surfaces of interior structure 542, and said surfaces may have a larger surface area than the counterpart surfaces of apparatus 10, 110, 210, 310, or 410 because of the spherical shape. As a result, body 520 may be smaller than bodies 10, 110, 210, 310, or 410 because a first velocity of first fluid $F_1$ at inlet 530 may be more efficiently transitioned to a second, slower velocity because of additional drag imposed by the larger surface areas. The spherical shapes of apparatus 510 also may provide optical advantages. As shown in FIG. 17, spherical interior surfaces 574 of reflecting chamber 570 may be configured to maximize the effectiveness of the radiation by reflecting it within body 520 and/or chamber 570, and concentrating the reflected radiation upon a volume of first fluid $F_1$ at a center of chamber 570. As also shown in FIG. 17, at least a portion of the disinfecting radiation may be discharged through outlet 580 with second fluid $F_2$.

Figure 18:
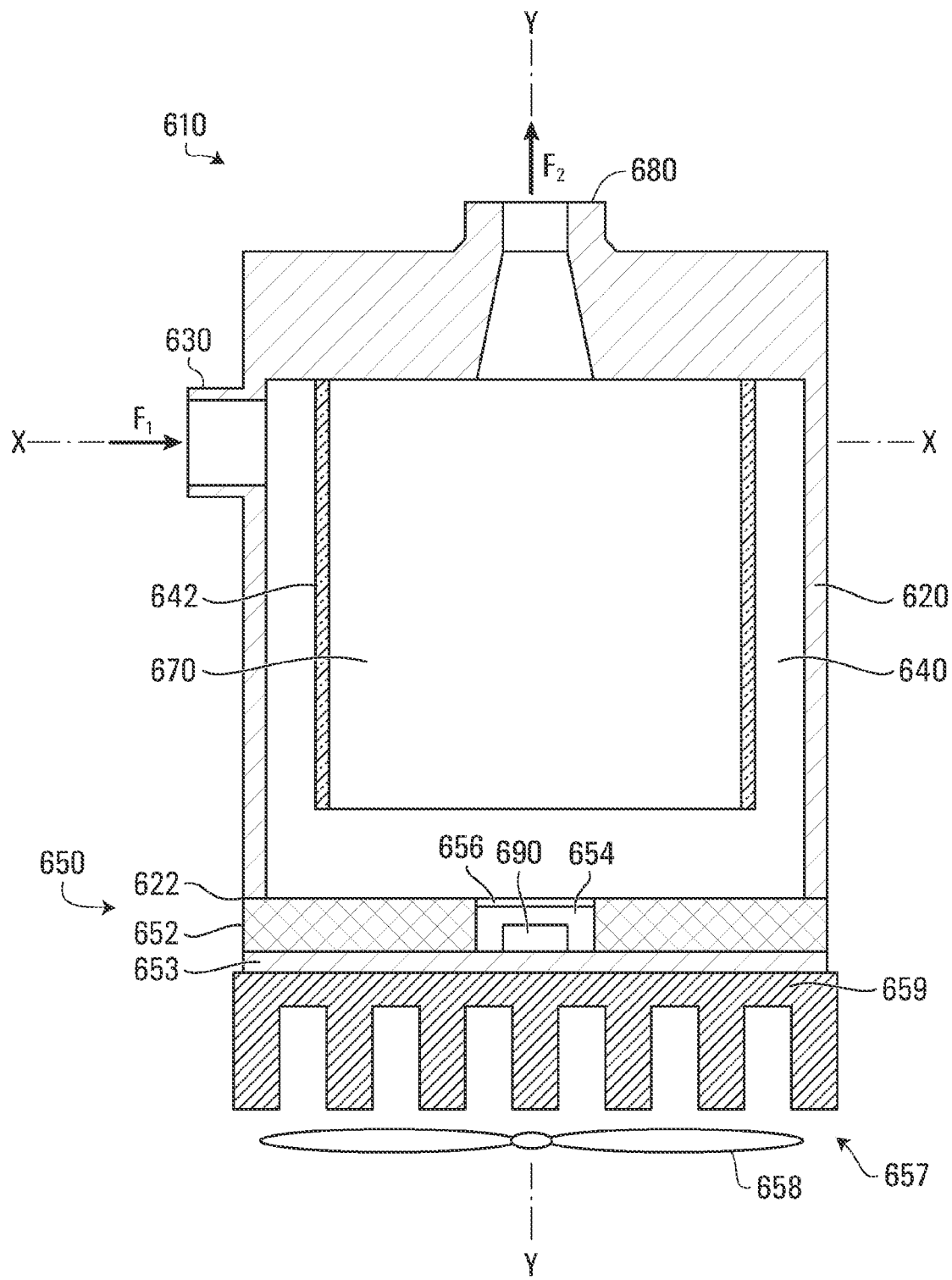
FIG. 18 depicts another exemplary fluid disinfection apparatus.

As shown in FIG. 18, disinfection apparatus 610 may comprise a body 620, an inlet 630, a fluid channel 644, a reflecting chamber 670, an outlet 680, and a radiation source 690. Except for the differences now described, these elements of apparatus 610 may be similar to counterpart elements of apparatus 10. For example, radiation source 690 may be more powerful than radiation source 90, causing additional heat. Aspects of apparatus may be modified to take the heat. As shown in FIG. 18, for example, apparatus 610 may comprise a cap 650 comprising a thermally insulating layer 652, a thermally conductive layer 653, and a cooling device 657.

Thermally insulating layer 652 may be attached to one end 622 of body 620 and configured to seal fluid chamber 640. As shown in FIG. 18, radiation source 690 may be mounted in an interior compartment 654 of insulating layer 652, and a window 656 may be used to seal source 690 in compartment 654 and pass the disinfecting energy into chamber 670 above. Thermally conductive layer 653 may be attached to both radiation source 690 and thermally insulating layer 652. Accordingly, the additional heat generated by radiation source 690 may be transferred to layer 653 with limited or zero transfer to body 620 because of insulating layer 652, which provides a thermal break between body 620 and conducting layer 653.

Cooling device 657 may be configured to discharge the additional heat. As shown in FIG. 18, device 657 may comprise a fan 658 and a heat sink 659. Heat sink 659 may be attached to or integral with thermally conductive layer 653, and may include a plurality of fins. Fan 658 may include an electric fan that is attached to or adjacent apparatus 610, and operable to discharge the additional heat into a surrounding environment by directing a flow of air over heat sink 659.

As described herein, any of disinfection apparatus 10, 110, 210, 310, 410, 510, and 610 may similarly utilize disinfecting radiation to disinfect first fluid $F_1$ within a corresponding reflecting chamber 70, 170, 270, 370, 470, 570, or 670.

Hydrodynamic aspects of these chambers may substantially eliminate jet velocities that might otherwise short circuit fluid $F_1$, especially where it has a high flow rate (e.g., greater than 1 gpm) and the chamber has a small volume (e.g., less than 500 mL). Accordingly, any of chambers 70, 170, 270, 370, 470, 570, or 670 may be configured such that fluid $F_1$ receives an optimal dose Q of disinfecting radiation. For example, dimensions of each chamber 70, 170, 270, 370, 470, 510, 610 may be similarly optimized based on volume such that the UV power loss due to water and surface absorption is minimized.

Numerous variations of apparatus 10 are also described with reference to apparatus 110, 210, 310, 410, 510, and 610. Any variation of apparatus 10 may include any radiation source 90, including any number of point sources in any arrangement. Aspects of these variations also may be combined, with each combination and iteration being part of this disclosure. For example, any variation of body 20 and/or cap 50 made from any thermally conductive material such as aluminum, copper, stainless steel, and or other materials; any of which may be coupled together to cool radiation source 90 with first fluid $F_1$. As a further example, any variation or apparatus 10 may likewise include a thermal break and/or cooling device similar to those of apparatus 610.

Any variation of disinfection apparatus 10 also may comprise a control element operable with radiation source 90 to control a flow of first fluid $F_1$ and/or second fluid $F_2$. For example, apparatus 10, 110, 210, 310, 410, 510, or 610 may comprise an upstream sensor configured to detect a demand for disinfected fluid and activate radiation source 90, 190, 290, 390, 490, 590, or 690 to meet that demand. As a further example, apparatus 10, 110, 210, 310, 410, 510, or 610 may likewise comprise a downstream sensor configured to determine a disinfection level of second fluid $F_2$, and close an operable valve at outlet 80, 180, 280, 380, 480, 580, or 680 if the disinfection level is unsatisfactory.

Figure 19:
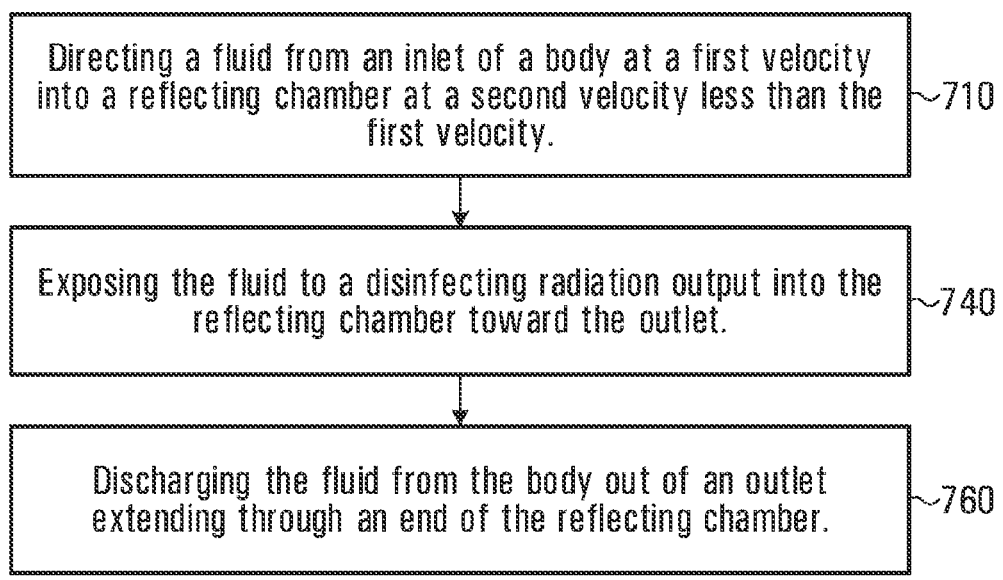
FIG. 19 depicts an exemplary fluid disinfection method.

Additional aspects of this disclosure are now described with reference to an exemplary disinfection method 700. For ease of description, aspects of method 700 are described with reference to disinfection apparatus 10, although similar aspects may likewise be described with reference to any of apparatus 110, 210, 310, 410, 510, and/or 610. As shown in FIG. 19, method 700 may comprise: directing first fluid $F_1$ from inlet 30 of body 20 at a first velocity into reflecting chamber 70 with a second velocity less than the first velocity (a "directing step 720"); exposing the fluid $F_1$ to a disinfecting radiation output into reflecting chamber 70 toward outlet 80 (an "exposing step 740"); and discharging fluid $F_1$ from body 20 out of outlet 80 extending through an end of the reflecting chamber (a "discharging step 760"). Exemplary aspects of steps 720, 740, and 760 are now described.

Directing step 720 may comprise any intermediate steps for receiving and/or directing first fluid $F_1$. For example, body 20 may comprise fluid channel 44 (e.g., FIG. 2), and directing step 720 may comprise directing the first fluid $F_1$ into reflecting chamber 70 through fluid channel 44. In some aspects, reflecting chamber 70 may have a length and a diameter, and the length divided by the diameter may be equal to between approximately 0.5 and approximately 2; or between approximately 0.5 and approximately 3. As shown in FIG. 2, inlet 30 and outlet 30 may at one of body 20, and step 720 may comprise: directing first fluid $F_1$ from inlet 30 in a first direction along to axis Y-Y; and directing fluid $F_1$ into reflecting chamber 70 in a second direction different from the first direction. For example, directing fluid $F_1$ from fluid channel 44 into reflecting chamber 70 may comprise directing the fluid $F_1$ from the first direction to the second direction. In some aspects, directing first fluid $F_1$ through fluid channel 44 may comprise causing fluid $F_1$ to at least partially surround chamber 70. Directing fluid $F_1$ through fluid channel 44 also may comprise directing first fluid $F_1$ between interior surface 28 of the body 20 and exterior surface 41 of reflecting chamber 70. In some aspects, step 720 may further comprise activating radiation sensor 90 in response to upstream sensor.

Exposing step 740 may comprise any intermediate steps for disinfecting first fluid $F_1$. For example, step 740 may comprise outputting the disinfecting radiation from radiation source 90, which may be disposed at end 22 of body 20. Step 720 and/or 740 may comprise diverting fluid $F_1$ from fluid channel 44 into reflecting chamber 70 with an internal surface 27 of body 20 disposed adjacent radiation source 90. Step 740 may further comprise outputting the radiation towards outlet 80, such as from one or more point sources of radiation source 90. In some aspects, inlet 30 may be substantially transverse with outlet 80, and the method may further comprise discharging at least a portion of the radiation out of outlet 80 with second fluid $F_2$. Step 740 also may comprise causing the disinfecting radiation to be reflected off of reflective surfaces of reflecting chamber 70.

As a further example, exposing step 740 may comprise outputting the disinfecting radiation through window 56, which may be disposed anywhere between radiation source 90 and reflecting chamber 70. In step 740, the disinfecting radiation may have a wavelength of between approximately 200 nm to approximately 320 nm; or between approximately 230 nm to approximately 290 nm, such that step 740 may comprise exposing fluid $F_1$ to a UV radiation. As further example, the disinfecting radiation may be output through an optical component, such as a lens configured to change an optical quality of the radiation.

Discharging step 760 may comprise any intermediate steps for discharging first fluid $F_1$ from body 20 as second fluid $F_2$. For example, step 760 may comprise modifying characteristics of fluid $F_1$, such as velocity or temperature; and/or operating a control valve at outlet 80 responsive to a downstream sensor.

While principles of the present disclosure are described herein with reference to illustrative aspects for particular applications, the disclosure is not limited thereto. Those having ordinary skill in the art and access to the teachings provided herein will recognize additional modifications, applications, aspects, and substitution of equivalents all fall in the scope of the aspects described herein. Accordingly, the present disclosure is not to be considered as limited by the foregoing description.

Embodiments in which an exclusive property or privilege is claimed are defined as follows:

1. A fluid disinfection apparatus comprising:
    a body defining at least:
        first and second interconnected volumes;
        a first lumen extending through the body and in fluid communication with the first interconnected volume; and
        a second lumen extending through the body and in fluid communication with the second interconnected volume;
    thermally conductive material;
    a window;
    a radiation source thermally coupled to the thermally conductive material and positioned to output disinfecting radiation through the window into the second interconnected volume in a direction generally parallel to an axis of the body; and
    an outlet defining the second lumen, wherein:
        the axis extends between a first end of the body and a second end of the body;
        the second interconnected volume is disposed between the first and second ends;
        the radiation source disposed adjacent the second end; and
        the fluid disinfection apparatus comprises an interior surface extending away from the window in a direction away from the axis of the body, the interior surface positioned to be in contact with fluid flowing in the body and facing towards the first end.

2. The fluid disinfection apparatus of claim 1 wherein the body is composed of the thermally conductive material.

3. The fluid disinfection apparatus of claim 1 wherein the interior surface is planar.

4. The fluid disinfection apparatus of claim 1 wherein the body is configured to direct the fluid along the second interconnected volume in the direction along the axis.

5. The fluid disinfection apparatus of claim 1 wherein the first interconnected volume at least partially surrounds the second interconnected volume.

6. The fluid disinfection apparatus of claim 1 wherein:
the first interconnected volume is positioned to receive the fluid from the first lumen through a cross section of the first lumen, the cross section of the first lumen having a first cross-sectional area;
the first interconnected volume is positioned to direct the fluid into the second interconnected volume through a cross section of the second interconnected volume, the cross section of the second interconnected volume having a second cross-sectional area; and
the second cross-sectional area is larger than the first cross-sectional area such that, when the first interconnected volume receives the fluid from the first lumen at a first average velocity, the first interconnected volume directs the fluid from the first lumen into the second interconnected volume at a second average velocity in the second interconnected volume, the second average velocity being less than the first average velocity.

7. The fluid disinfection apparatus of claim 1 further comprising an inlet defining the first lumen, wherein the inlet is adjacent the first end.

8. The fluid disinfection apparatus of claim 1 wherein the second interconnected volume is a reflecting chamber, and interior surfaces of the reflecting chamber include a UV reflective material.

9. The fluid disinfection apparatus of claim 1 wherein the radiation source includes one or more point sources.

10. The fluid disinfection apparatus of claim 1 further comprising a cap attached to the body and comprising at least some of the thermally conductive material.

11. The fluid disinfection apparatus of claim 1 wherein:
the first interconnected volume is a fluid channel; and
the second interconnected volume is a reflecting chamber.

12. The fluid disinfection apparatus of claim 1 wherein the interior surface is positioned to be in contact with the fluid at least as the fluid is directed between the first interconnected volume and the second interconnected volume.

13. The fluid disinfection apparatus of claim 1 wherein the second interconnected volume includes a truncated-cone shape.

14. A method of operating the fluid disinfection apparatus of claim 1, the method comprising causing the fluid to flow into the first lumen, from the first lumen into the first interconnected volume, from the first interconnected volume into the second interconnected volume, and from the second interconnected volume toward and out of the second lumen such that the fluid is thermally coupled to the thermally conductive material.

15. A method of operating the fluid disinfection apparatus of claim 1, the method comprising causing the fluid to flow into the first lumen, from the first lumen into the first interconnected volume, from the first interconnected volume into the second interconnected volume, and from the second interconnected volume toward and out of the second lumen such that the fluid is in contact with the interior surface.

16. The fluid disinfection apparatus of claim 1 wherein the interior surface is adjacent the window.

17. The fluid disinfection apparatus of claim 1 wherein the outlet extends through the first end.

18. The fluid disinfection apparatus of claim 1 wherein the body comprises at least some of the thermally conductive material.

19. The fluid disinfection apparatus of claim 1 wherein the radiation source is attached to the thermally conductive material.

20. The fluid disinfection apparatus of claim 1 wherein the thermally conductive material comprises the interior surface.

21. The fluid disinfection apparatus of claim 4 wherein:
the second interconnected volume is defined by an interior structure extending along the axis in the body;
the first interconnected volume is defined by the interior structure and on an exterior side of the interior structure; and
the second interconnected volume is defined by the interior structure and on an interior side of the interior structure.

22. The fluid disinfection apparatus of claim 21 wherein the interior surface extends at least to a widest extent of the first interconnected volume from the axis.

23. The fluid disinfection apparatus of claim 21 wherein the interior surface extends at least to a widest extent of the second interconnected volume from the axis.

24. The fluid disinfection apparatus of claim 21 wherein the body permits the fluid to flow between the first interconnected volume and the second interconnected volume directly substantially across an entire width of the second interconnected volume from the axis.

25. The fluid disinfection apparatus of claim 21 wherein the body permits the fluid to flow between the first interconnected volume and the second interconnected volume directly across an entire width of the second interconnected volume.

26. The fluid disinfection apparatus of claim 21 wherein the second interconnected volume has a length and a diameter, and the length divided by the diameter is equal to between approximately 0.5 and approximately 2.

27. The fluid disinfection apparatus of claim 21 wherein the second interconnected volume has a length and a diameter, and the length divided by the diameter is equal to between approximately 0.5 and approximately 3.

28. The fluid disinfection apparatus of claim 10 wherein the radiation source is behind the interior surface on a side of the interior surface towards the second end in an interior compartment of the cap.

29. The fluid disinfection apparatus of claim 10 wherein the cap comprises the interior surface.

30. The fluid disinfection apparatus of claim 10 wherein the cap comprises at least some of the interior surface.

* * * * *